United States Patent
Czinger et al.

(10) Patent No.: US 10,480,555 B2
(45) Date of Patent: Nov. 19, 2019

(54) SYSTEMS AND METHODS FOR JOINING NODE AND TUBE STRUCTURES

(71) Applicant: DIVERGENT TECHNOLOGIES, INC., Los Angeles, CA (US)

(72) Inventors: Kevin Robert Czinger, Santa Monica, CA (US); Broc William TenHouten, Rancho Palos Verdes, CA (US); John Russell Bucknell, El Segundo, CA (US); Antonio Bernerd Martinez, El Segundo, CA (US); Eahab Nagi El Naga, Topanga, CA (US); William Bradley Balzer, Santa Monica, CA (US); Zachary Meyer Omohundro, Hermosa Beach, CA (US); Praveen Varma Penmetsa, Long Beach, CA (US); Matthew Michael O'Brien, Hermosa Beach, CA (US); John Franklin Dunham, Oakland, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 0 days.

(21) Appl. No.: 15/671,894

(22) Filed: Aug. 8, 2017

(65) Prior Publication Data

US 2019/0048912 A1 Feb. 14, 2019

(51) Int. Cl.
*F16B 11/00* (2006.01)
*B62D 21/02* (2006.01)
(Continued)

(52) U.S. Cl.
CPC .......... *F16B 11/006* (2013.01); *B62D 21/02* (2013.01); *B62D 29/04* (2013.01); *E04B 1/1903* (2013.01);
(Continued)

(58) Field of Classification Search
CPC ....... F16B 11/006; B62D 21/02; B62D 29/04; B62D 21/183; E04B 1/1903; E04B 2001/1972; E04B 2001/1927
See application file for complete search history.

(56) References Cited

U.S. PATENT DOCUMENTS 4,660,345 A * 4/1987 Browning .............. B62D 21/08
164/63
4,677,805 A * 7/1987 Schleisner ............ E04B 1/1903
403/170
(Continued)

FOREIGN PATENT DOCUMENTS

DE 2519769 * 5/1975
DE 102015014356 B3 * 11/2015
(Continued)

OTHER PUBLICATIONS

Robotbike Co. Website: Article entitled "Technology," https://robotbike.co/technology/?v=7516fd43adaa, The Robot Bike Company Ltd., UK Registered Company No. 9224668, Company founded Jan. 2013, Email: info@robotbike.co.
(Continued)

*Primary Examiner* — Adriana Figueroa
(74) *Attorney, Agent, or Firm* — Arent Fox LLP

(57) ABSTRACT

Connections between nodes and tubes are provided. An apparatus can include additively manufactured first and second nodes, a tube, and an interconnect connecting the tube to the first and second nodes. An apparatus can include a node having an end portion with inner and outer concentric portions forming an annular gap therebetween, and a tube having an end portion extending into the gap.

11 Claims, 21 Drawing Sheets

(51) Int. Cl.
    *B62D 29/04*     (2006.01)
    *E04B 1/19*     (2006.01)
    *B62D 21/18*     (2006.01)

(52) U.S. Cl.
    CPC .... *B62D 21/183* (2013.01); *E04B 2001/1927* (2013.01); *E04B 2001/1972* (2013.01)

(56) References Cited

U.S. PATENT DOCUMENTS

| | | | | |
|---|---|---|---|---|
| 4,721,407 A * | 1/1988 | Liu | ............ | B62K 19/22 403/205 |
| 4,735,355 A * | 4/1988 | Browning | ............ | B62D 21/08 228/138 |
| 4,988,230 A * | 1/1991 | Banthia | ............ | A47B 47/0008 403/170 |
| 6,247,869 B1 * | 6/2001 | Lichvar | ............ | F16L 47/00 285/179.1 |
| 6,389,697 B1 * | 5/2002 | Benoit | ............ | B21D 26/14 29/897.2 |
| 9,567,013 B2 * | 2/2017 | Ehrlich | ............ | B62D 27/02 |
| 9,884,663 B2 * | 2/2018 | Czinger | ............ | B62D 23/005 |
| 9,975,179 B2 * | 5/2018 | Czinger | ............ | B22F 3/1055 |
| 2003/0067160 A1 * | 4/2003 | Wenck | ............ | E04B 1/5843 285/15 |
| 2006/0001285 A1 * | 1/2006 | Patberg | ............ | B62D 23/00 296/29 |
| 2007/0209757 A1 | 9/2007 | Hengel et al. | | |
| 2008/0079308 A1 | 4/2008 | Kretschmer | | |
| 2009/0014121 A1 | 1/2009 | McPherson | | |
| 2014/0348572 A1 * | 11/2014 | Matsuzawa | ............ | E04B 1/19 403/57 |
| 2016/0325796 A1 | 11/2016 | Czinger et al. | | |
| 2017/0001368 A1 | 1/2017 | Czinger et al. | | |
| 2017/0057558 A1 | 3/2017 | Hillebrecht et al. | | |

FOREIGN PATENT DOCUMENTS

EP          1359333 A1     11/2003
EP          15182959.5     8/2015

OTHER PUBLICATIONS

International Search Report and Written Opinion dated Nov. 27, 2018, regarding PCT/US2018/045023.
First China Office Action dated Mar. 27, 2019 regarding China Application No. CN201821272910.5.

* cited by examiner

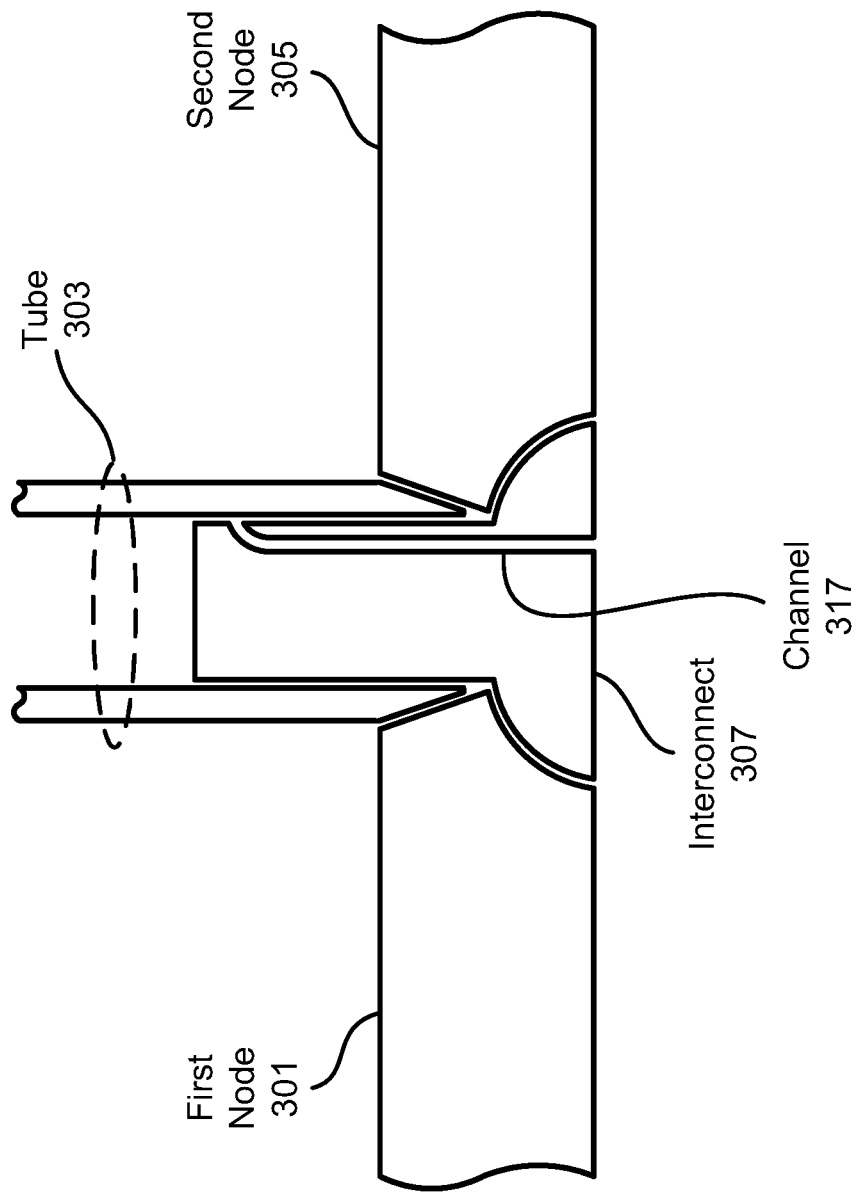

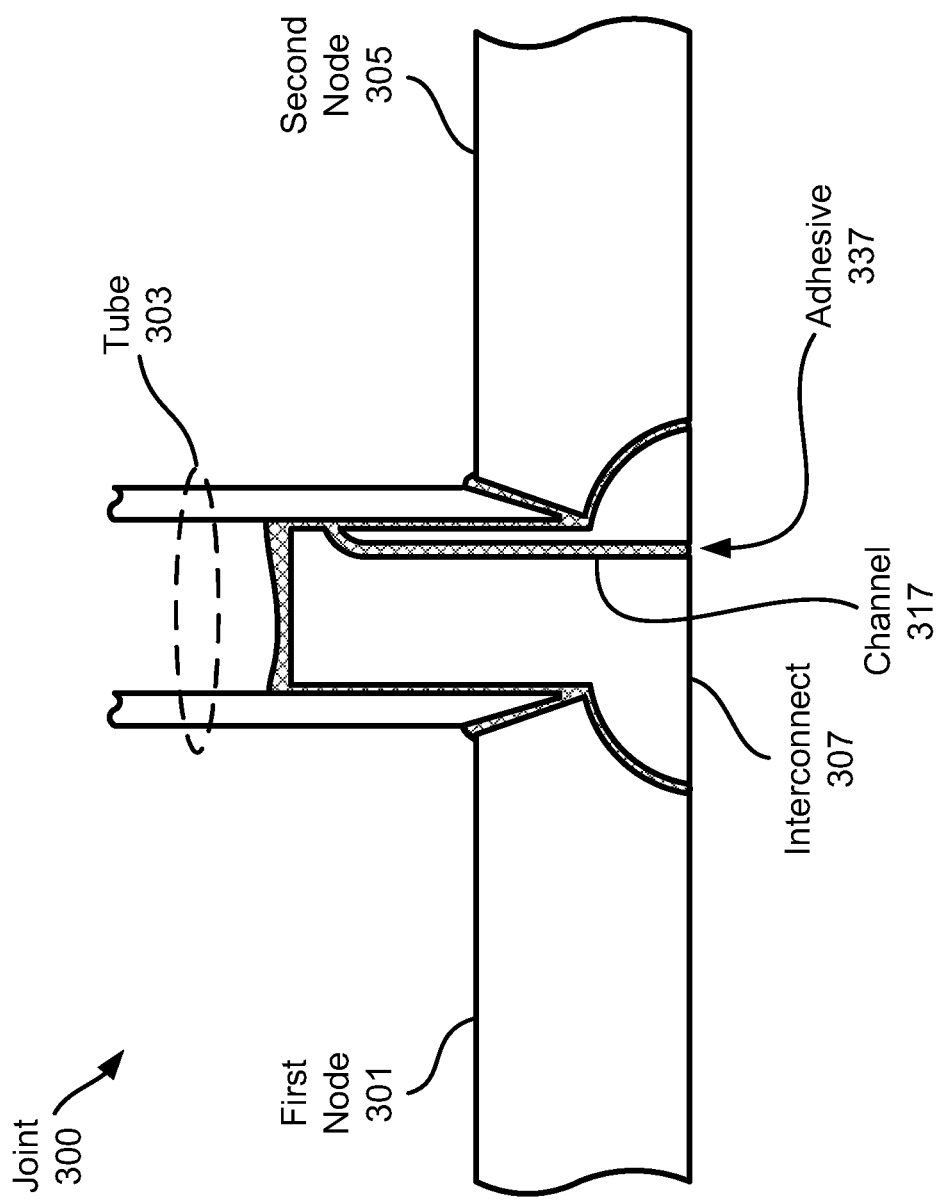

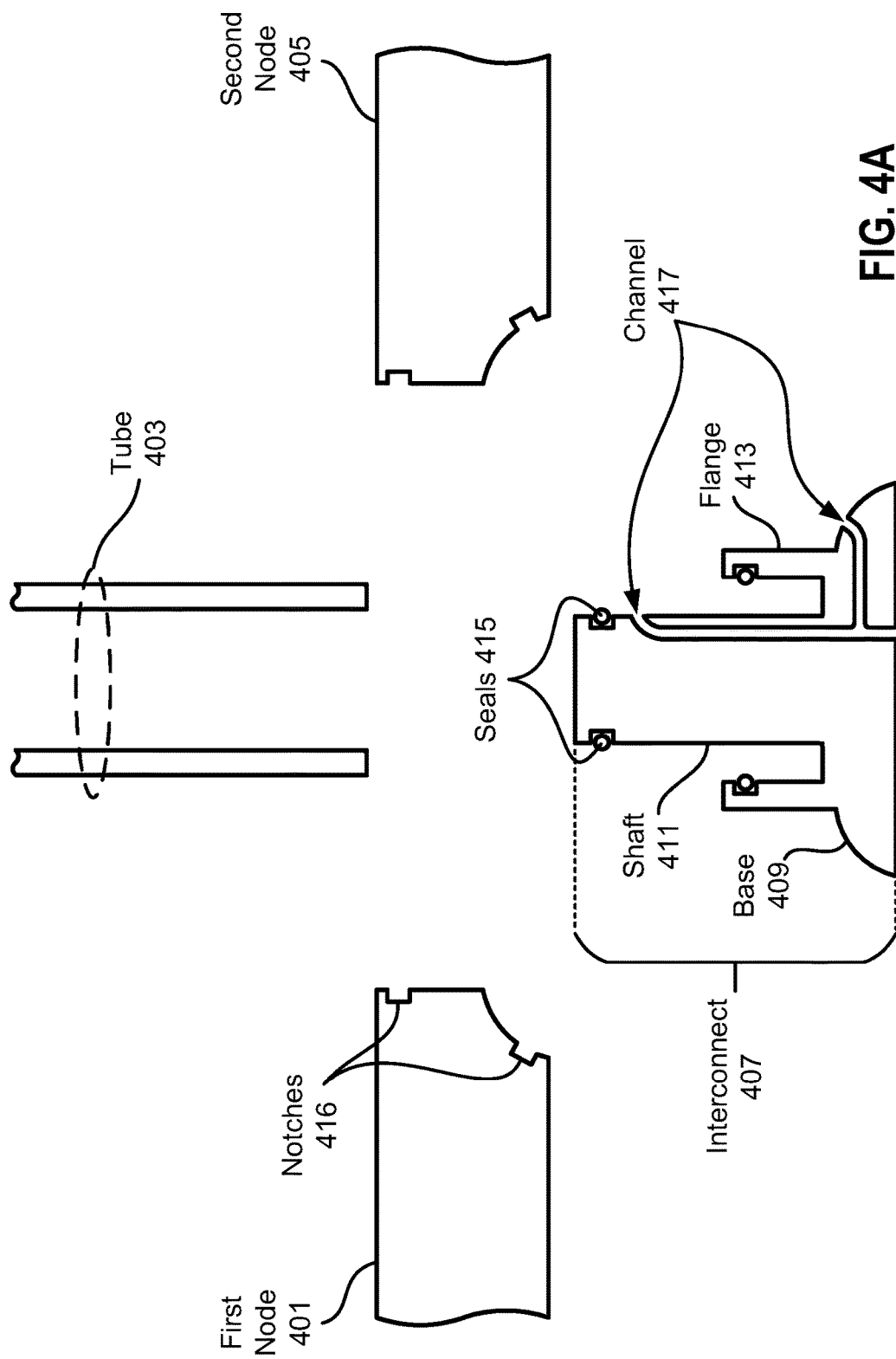

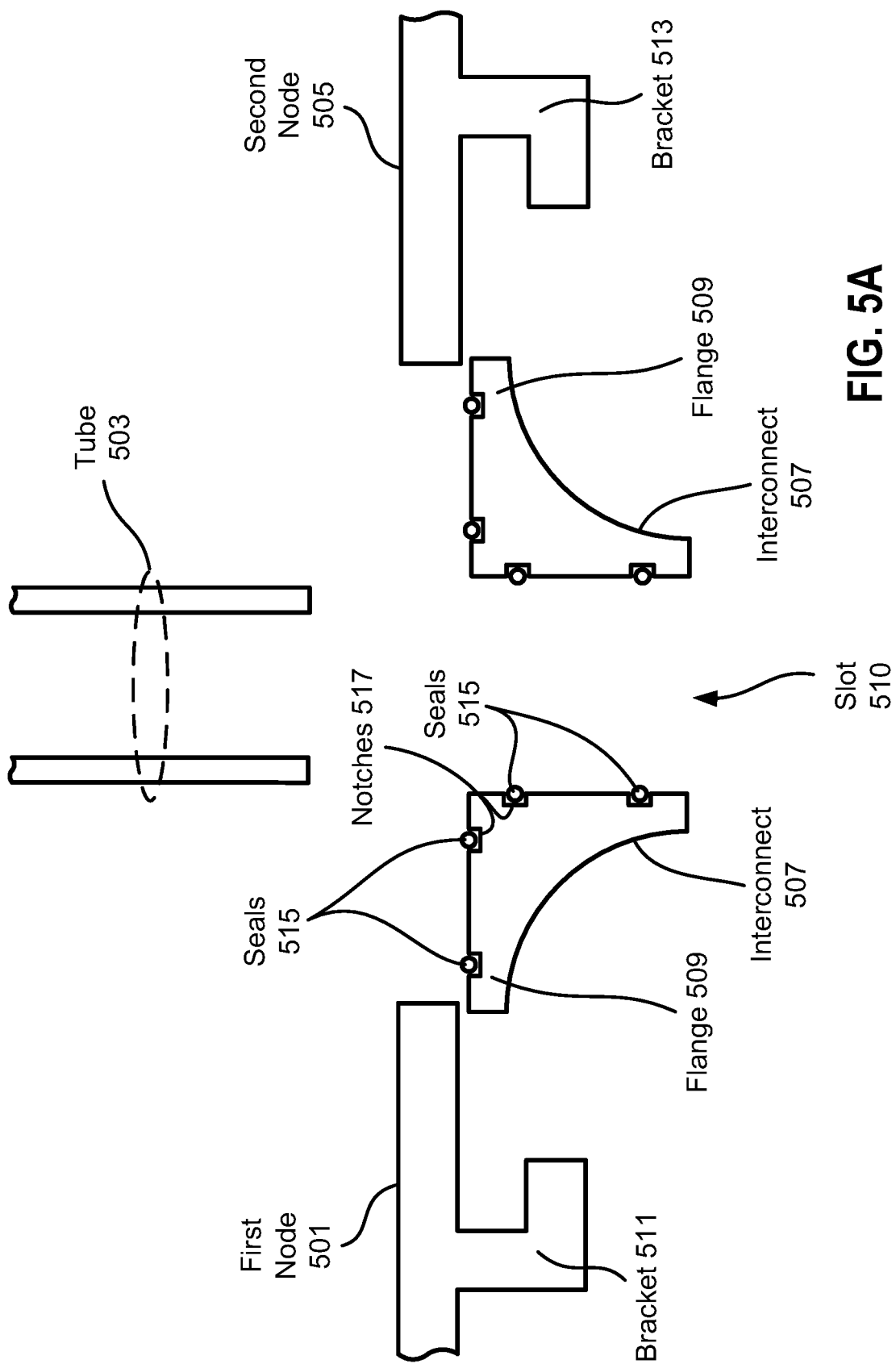

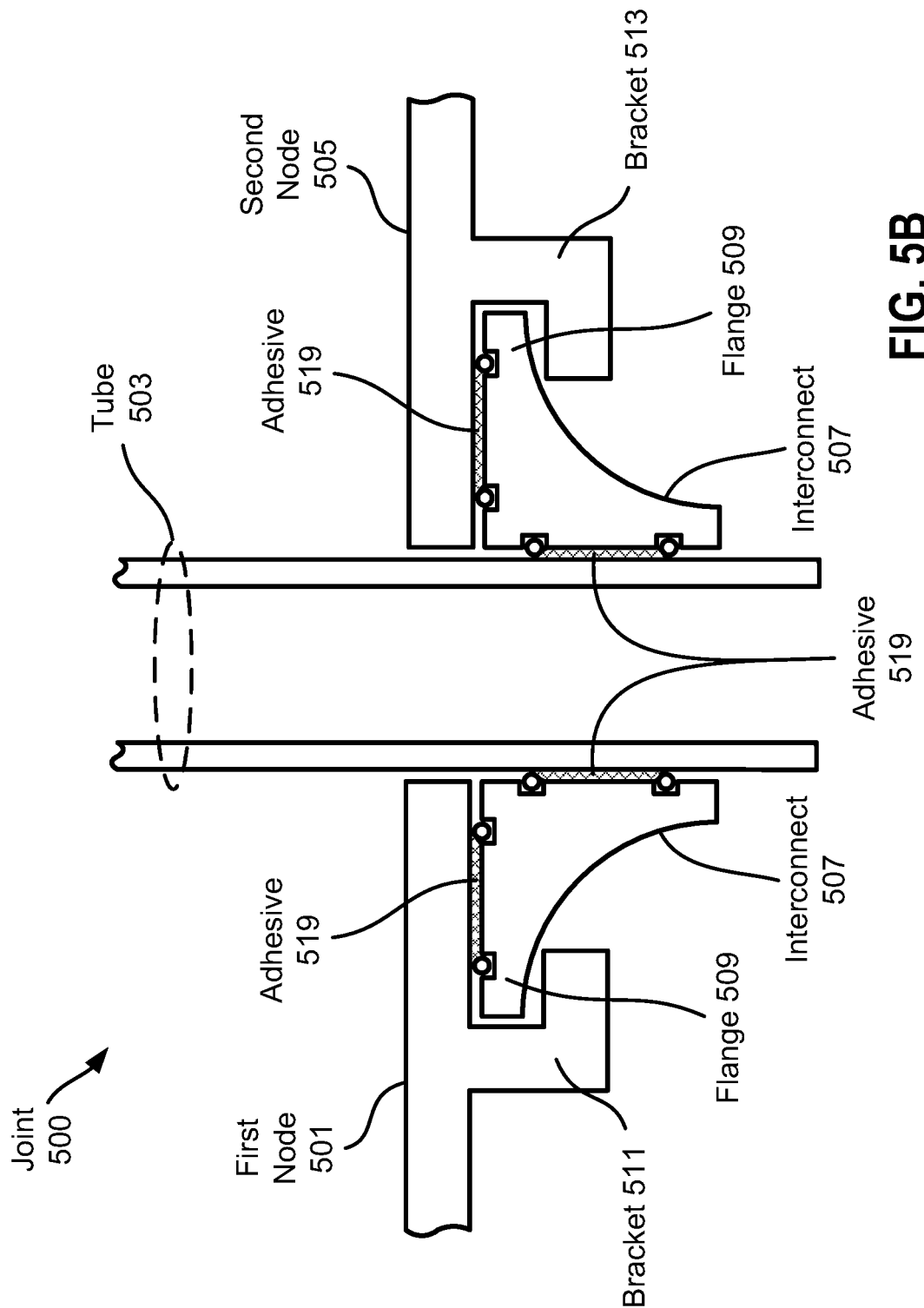

SYSTEMS AND METHODS FOR JOINING NODE AND TUBE STRUCTURES

BACKGROUND

Field

The present disclosure relates generally to connections between structures, and more particularly, to connections between nodes and tubes.

Background

Space frame and monocoque construction are both used in automotive, structural, marine, and many other applications. One example of space frame construction can be a welded tube frame chassis construction, often used in low volume and high performance vehicle design due to the advantages of low tooling costs, design flexibility, and the ability to produce high efficiency structures. These structures require that tubes of the chassis be connected at a wide variety of angles and may require the same connection point to accommodate a variety of tube geometries. Traditional methods fabrication of joint members for connection of such tube frame chassis may incur high equipment and manufacturing costs. Additionally, monocoque design may lead to design inflexibility when using planar elements, or high tooling costs when shaped panels are incorporated.

SUMMARY

Several aspects of node-tube connections will be described more fully hereinafter.

In various aspects, an apparatus can include additively manufactured first and second nodes, a tube, and an interconnect connecting the tube to the first and second nodes.

In various aspects, an apparatus can include a node having an end portion with inner and outer concentric portions forming an annular gap therebetween, and a tube having an end portion extending into the gap.

Other aspects will become readily apparent to those skilled in the art from the following detailed description, wherein is shown and described only several embodiments by way of illustration. As will be realized by those skilled in the art, concepts herein are capable of other and different embodiments, and several details are capable of modification in various other respects, all without departing from the present disclosure. Accordingly, the drawings and detailed description are to be regarded as illustrative in nature and not as restrictive.

BRIEF DESCRIPTION OF THE DRAWINGS

Various aspects of will now be presented in the detailed description by way of example, and not by way of limitation, in the accompanying drawings, wherein:

FIGS. 3A-D illustrate exemplary nodes, tube, and interconnect that form a joint.

FIGS. 4A-D illustrate exemplary nodes, tube, interconnect, and seals that form a joint including a double-shear connection.

FIGS. 5A-C illustrate other exemplary nodes, tube, and interconnect that form a joint.

DETAILED DESCRIPTION

The detailed description set forth below in connection with the appended drawings is intended to provide a description of various exemplary embodiments of the concepts disclosed herein and is not intended to represent the only embodiments in which the disclosure may be practiced. The term "exemplary" used in this disclosure means "serving as an example, instance, or illustration," and should not necessarily be construed as preferred or advantageous over other embodiments presented in this disclosure. The detailed description includes specific details for the purpose of providing a thorough and complete disclosure that fully conveys the scope of the concepts to those skilled in the art. However, the disclosure may be practiced without these specific details. In some instances, well-known structures and components may be shown in block diagram form, or omitted entirely, in order to avoid obscuring the various concepts presented throughout this disclosure.

A node is an additively manufactured (AM) structure that includes a feature, e.g., a socket, a receptacle, etc., for accepting another structure, e.g., a tube, a panel, etc. This disclosure focuses on attachment designs for connecting the various parts of the node-based assembly. Some interconnection designs are devised primarily to account for the higher levels of dimensional tolerance acceptance that may be encountered when assembling the complex structures. Some designs are also constructed with the intent of reducing weight, minimizing post-processing involved, and maximizing ease of assembly. Recurring components of these ideas are using sockets to adjust for tolerance and co-printing parts to utilize the uniqueness of 3-D printing and simplify the assembly process. For each method, a brazing slurry, a thermoplastic, a thermoset, etc., may be used in place of an adhesive.

Figure 1:
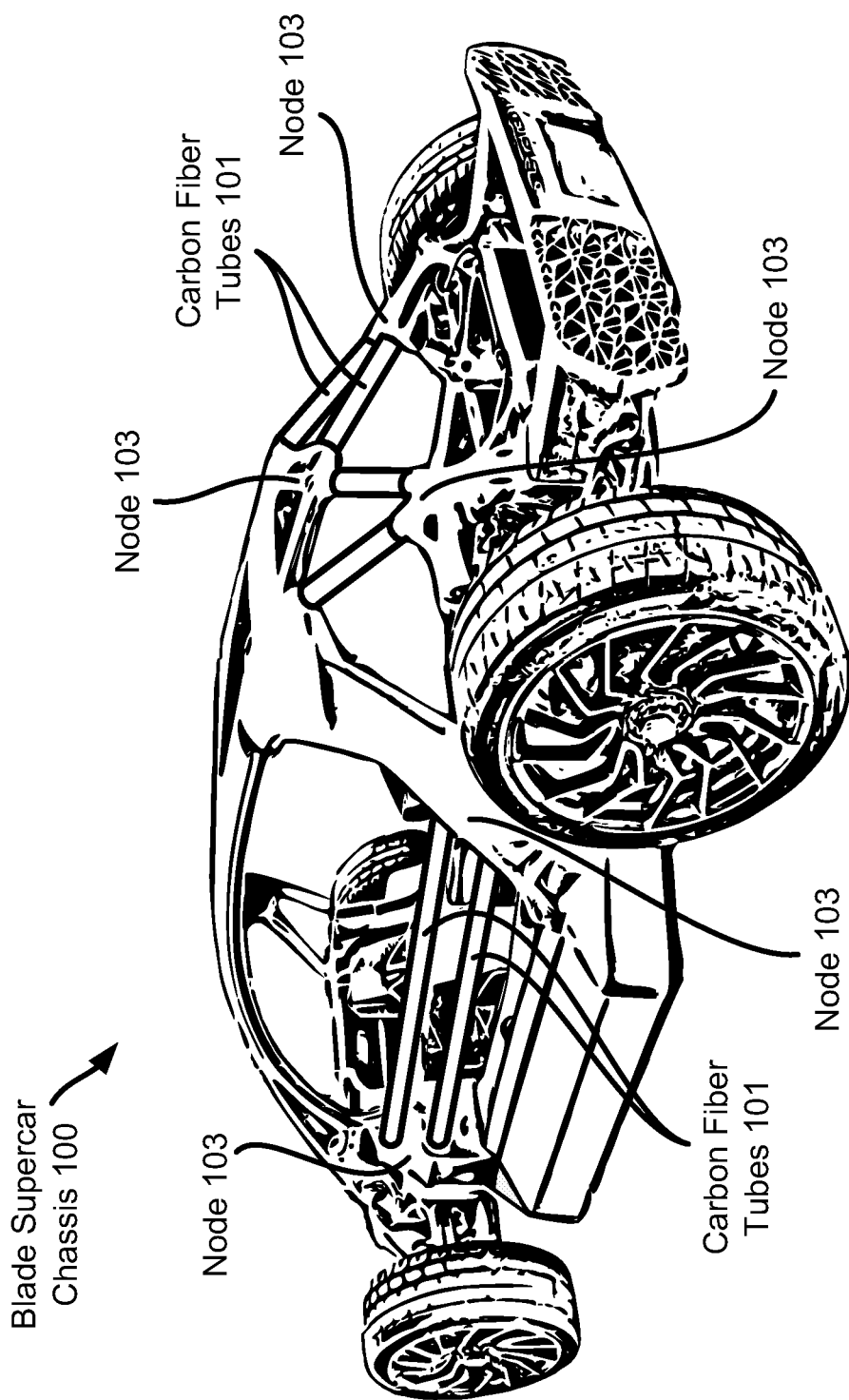
FIG. 1 shows an exemplary vehicle chassis, Blade supercar chassis, in which aspects of the disclosure may be implemented.

FIG. 1 illustrates an exemplary car chassis, i.e., Blade supercar chassis 100 built by Divergent Technologies, Inc., that includes nodes and tubes as part of the structure. Automobile chassis, such as Blade supercar chassis 100, are examples of structures in which aspects of the disclosure can be practiced. Although the examples described herein are directed primarily to vehicle structures, such as chassis, crush zones, etc., it should be understood that aspects of the disclosure can be applied to other structures that include node-tube connections.

Blade supercar chassis 100 includes carbon fiber tubes 101 connected by one or more nodes 103. Each node 103 can include, for example, a central body and one or more ports that extend from the central body. In various embodiments, a multi-port node may be provided to connect tubes, such as carbon fiber tubes 101, to form a two or three-dimensional structure. The structure may be a frame, for example. In one example, a structure having tubes with axes in substantially the same plane can be referred to as a planar frame, while a structure having tubes with axes in different planes may be referred to as a space frame. A space frame may define a volume. In some examples, a three-dimensional space frame structure may be a vehicle chassis. The vehicle chassis may be have a length, width, and height that define a space, such as a passenger compartment of the vehicle.

A vehicle chassis may form the framework of a vehicle. A vehicle chassis may provide the structure for placement of body panels of a vehicle, such as door panels, roof panels, floor panels, or any other panels forming the vehicle enclosure. Furthermore the chassis may be the structural support for the wheels, drive train, engine block, electrical components, heating and cooling systems, seats, storage space, etc. A vehicle may be a passenger vehicle, a cargo vehicle, etc. Examples of vehicles may include, but are not limited to sedans, trucks, buses, vans, minivans, station wagons, RVs, trailers, tractors, go-carts, automobiles, trains, or motorcycles, boats, spacecraft, or airplanes (e.g., winged aircraft, rotorcraft, gliders, lighter-than-air aerial vehicles). The vehicles may be land-based vehicles, aerial vehicles, water-based vehicles, or space-based vehicles. Any description herein of any type of vehicle or vehicle chassis may apply to any other type of vehicle or vehicle chassis.

The vehicle chassis may provide a form factor that matches the form factor of the type of vehicle. Depending on the type of vehicle, the vehicle chassis may have varying configurations. The vehicle chassis may have varying levels of complexity. In some instances, a three-dimensional space frame may be provided that may provide an outer framework for the vehicle. The outer framework may be configured to accept body panels to form a three-dimensional enclosure. In some cases, inner supports or components may be provided. The inner supports or components can be connected to the space frame through connection to the one or more joint members of the space frame. Different layouts of multi-port nodes and connecting tubes may be provided to accommodate different vehicle chassis configurations. In some cases, a set of nodes can be arranged to form a single unique chassis design. In some cases, at least a subset of the set of nodes can be used to form multiple chassis designs. In some cases at least a subset of nodes in a set of nodes can be assembled into a first chassis design and then disassembled and reused to form a second chassis design. The first chassis design and the second chassis design can be the same or they can be different.

In this example, carbon fiber tubes 101 are carbon fiber material. In various implementations, other composite materials may be used. Examples of composite materials include high modulus carbon fiber composite, high strength carbon fiber composite, plain weave carbon fiber composite, harness satin weave carbon composite, low modulus carbon fiber composite, low strength carbon fiber composite, etc. In some implementations, the tubes may be formed from other materials, such as plastics, polymers, metals, metal alloys, etc. The tubes may be formed from rigid materials. The tubes may be formed of one or more metal and/or non-metal materials.

The connecting tubes may have different cross-sectional shapes. For example, the connecting tubes may have a substantially circular shape, square shape, oval shape, hexagonal shape, or an irregular shape. The connecting tube cross-section could be a closed cross-section. The connecting tube cross-section could be an open cross-section, such as a C-channel, an I-beam, an angle, etc.

The tubes may be hollow tubes. A hollow portion may be provided along the entire length of the tube. For example, the connecting tubes may have an inner surface and an outer surface. An inner diameter for the tube may correspond to an inner surface of the connecting tube. An outer diameter of the tube may correspond to an outer diameter of the connecting tube. A connecting tube may have two ends. The two ends may be opposing one another. In some embodiments, the connecting tubes may have three, four, five, six or more ends.

Various aspects of node-to-tube connections presented in this disclosure may be suitable for use in a vehicle chassis frame such as Blade supercar chassis 100 shown in FIG. 1. The nodes in the chassis frame 100 may be designed to fit the tube angles dictated by the chassis design. The nodes may be fabricated to desired geometries to permit rapid and low cost assembly of the chassis. In some embodiments the nodes may be fabricated using 3-D printing techniques. 3-D printing may permit the nodes to be formed in a wide array of geometries that may accommodate different frame configurations. 3-D printing may permit the nodes to be formed based on a computer generated design file that includes dimensions of the nodes.

A node may be composed of a metallic material (e.g. aluminum, titanium, stainless steel, brass, copper, chromoly steel, iron, etc.), a composite material (e.g. carbon fiber, etc.), a polymeric material (e.g. plastic, etc.), a combination of these materials and/or other materials, etc. The node can be formed from a powder material. The nodes may be formed of one or more metal and/or non-metal materials. The 3-D printer can melt and/or sinter at least a portion of the powder material to form the node. The node may be formed of a substantially rigid material.

FIGS. 2A-E, 3A-D, 4A-D, 5A-C, and 6A-D illustrate exemplary node-tube joints (a.k.a., connections). FIGS. 2A-E, 3A-D, 4A-D, and 5A-C illustrate techniques in which first and second nodes can be joined to a tube with an interconnect connecting the tube to the first and second nodes. FIG. 6A-D illustrates a technique in which a node can be joined to a tube. In various embodiments, the joining can result in a smooth, flat surface that has an appealing look and that reduces the need for post-processing, such as sanding, finishing, etc. In this way, for example, nodes and tubes can be joined in such a way that manufacturing time and cost can be reduced. In various embodiments, one or more spacer structures can be arranged between components of a joint, e.g., between a node and a tube, between two nodes, between a tube and an interconnect, etc., in order to prevent these components from contacting each other. In this way, for example, nodes and tubes made of dissimilar materials can be joined in a way that can help reduce or prevent the different materials from reacting with each other. For example, nodes and tubes made of different metals may be joined in a way that helps reduce or prevent galvanic corrosion. This can, for example, expand the available options for the materials used in the different components of the joint, which may allow selection of more suitable materials for individual components. In turn, the expanded material options may allow better performance, durability, weight savings, cost, etc., of the joint.

Figure 2A:
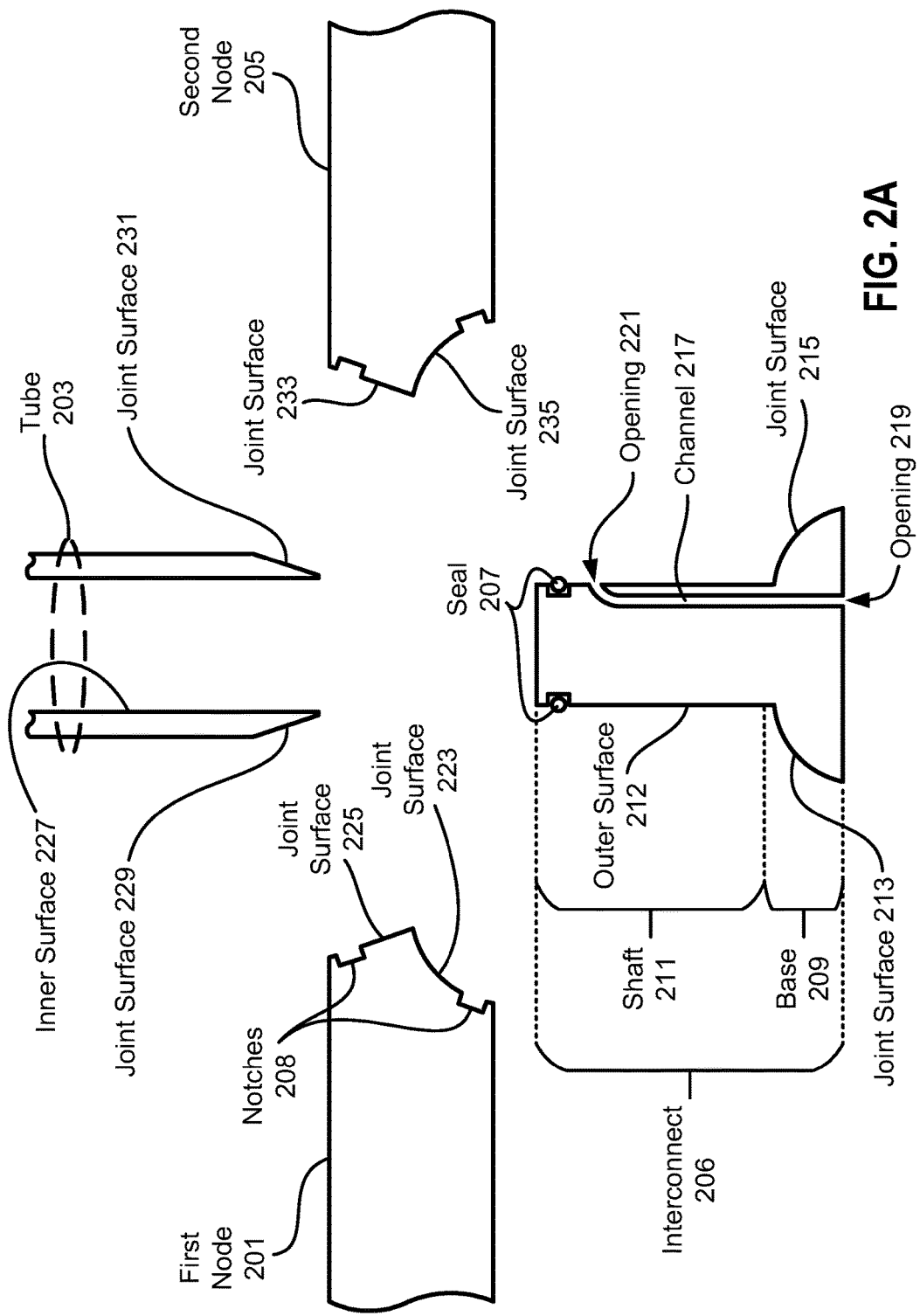
FIGS. 2A-E illustrate exemplary nodes, tube, interconnect, and seals that form a joint.
Figure 2B:
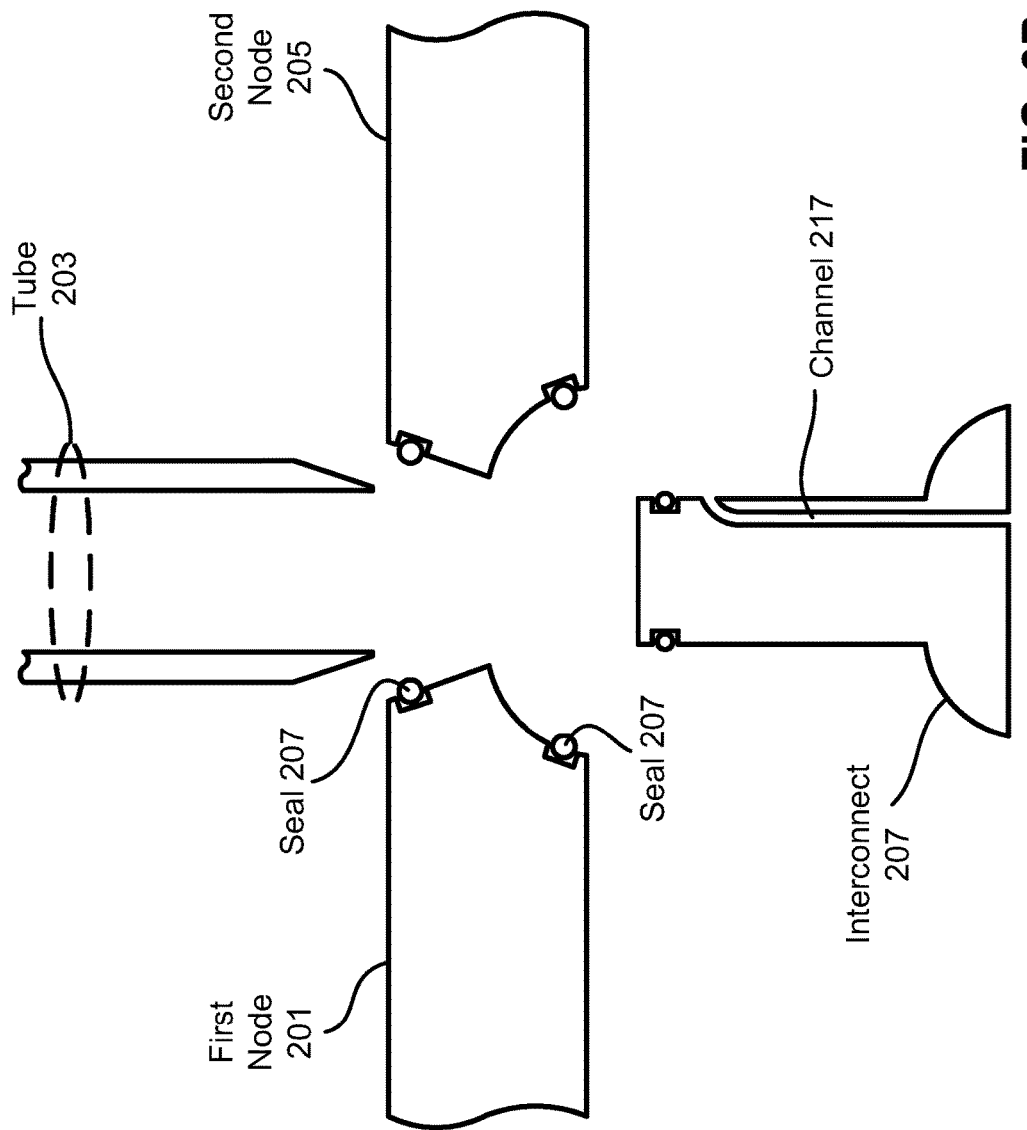
Figure 2C:
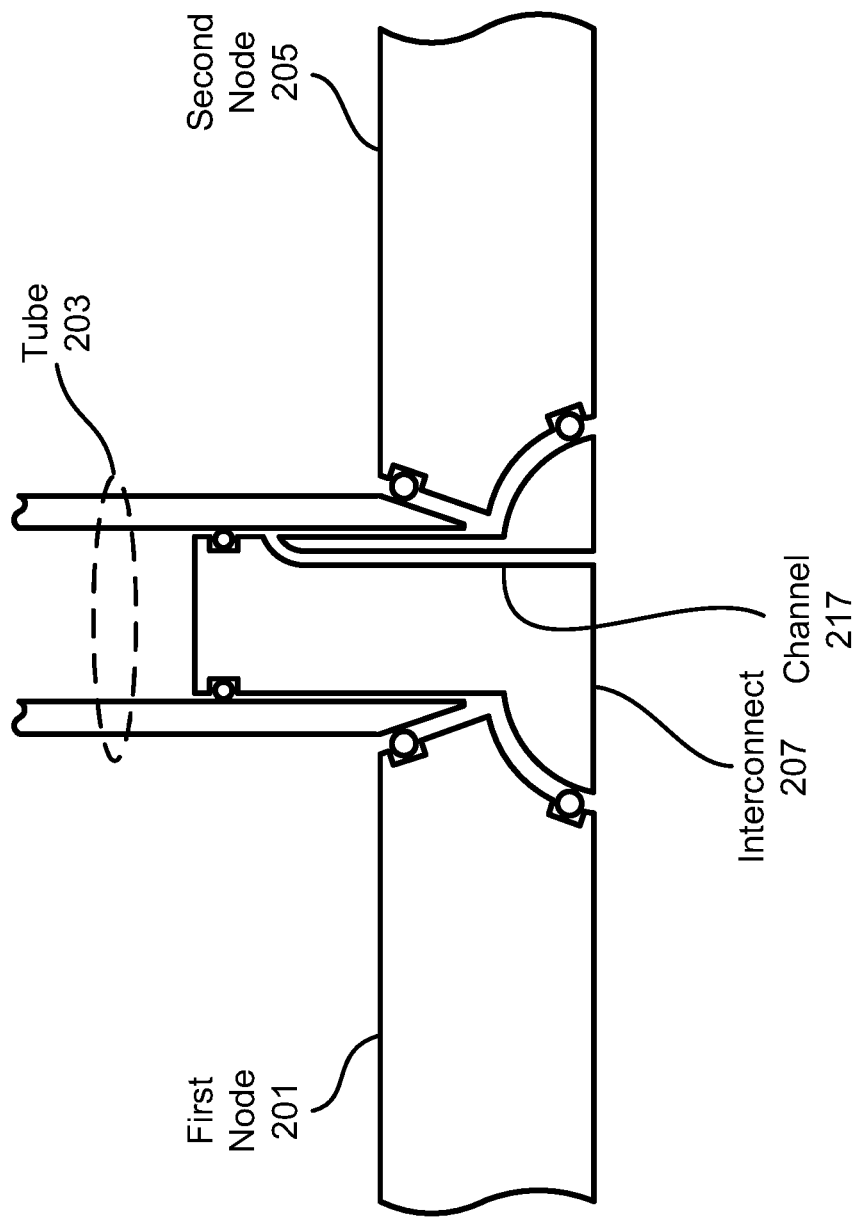
Figure 2D:
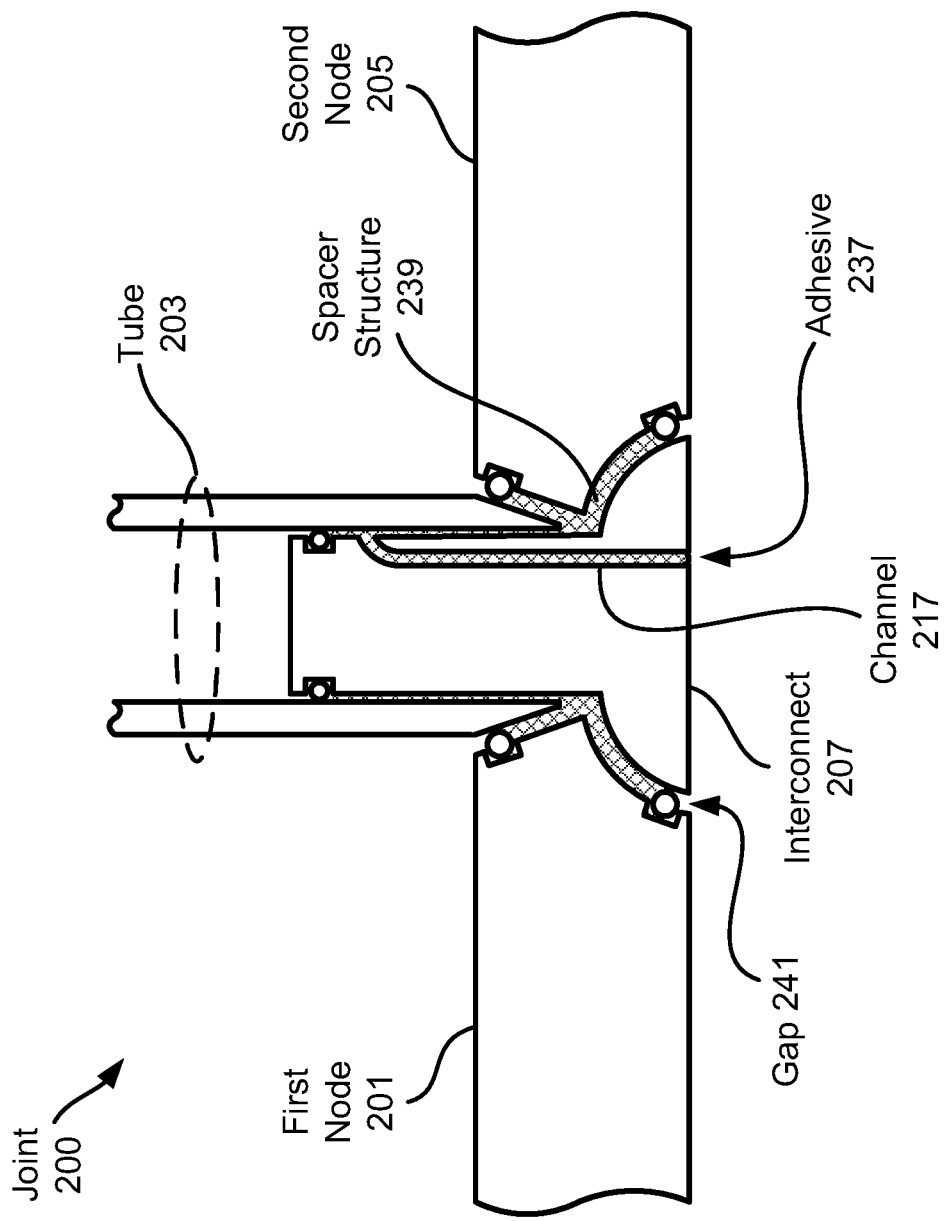
Figure 2E:
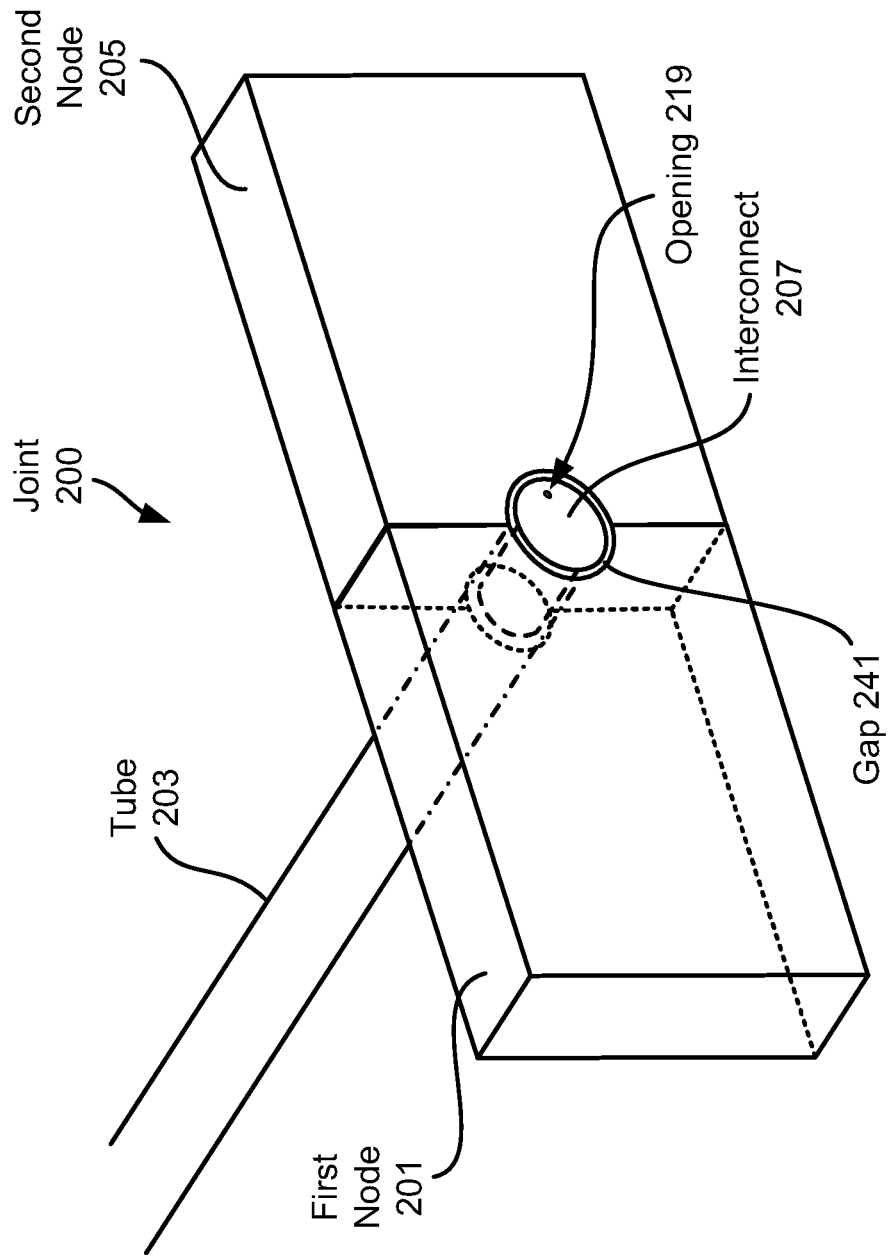

FIGS. 2A-E illustrate exemplary nodes, tube, and interconnect that form a joint 200 (shown in FIGS. 2D and 2E). This example configuration includes a spacer structure formed between the components of the joint. In this example, the spacer structure includes an arrangement of seals that create a sealed space between components and an adhesive that is injected into the sealed space. By sealing the space, the seals can prevent the adhesive from leaking out from the sealed space, which may allow the joint to be formed more efficiently and may provide a cleaner-looking joint. In addition, the seals can keep the components separated at a desired distance while the adhesive cures. The seals can also help protect the adhesive from the environment, e.g., air, water, etc., which may reduce damage or degradation of the adhesive caused by environmental factors. Depending on the composition and design of the seals, the seals may provide other benefits to the spacer structure once the adhesive is cured, such as adding rigidity, flexibility, durability, etc., to the structure. The distance created by the spacer structure between the components can be designed to prevent or reduce a reaction between the components, such as galvanic corrosion.

FIG. 2A illustrates various components of joint 200 prior to assembly and joining. In particular, a first node 201, a tube 203, and a second node 205 can be joined by an interconnect 206. First node 201, second node 205, and interconnect 206 can each include notches 208 for the positioning of seals 207. Prior to assembly, as shown in FIG. 2A, one of the seals 207 can be positioned in notch 208 on shaft 211 of interconnect 206. In various embodiments, seals 207 can be rubber seals, such as rubber rings, which can compress to form a seal between adjacent components once the joint is assembled. In various embodiments, seals may be made of other materials, such as plastic, metal, etc.

Interconnect 206 can include a base 209 and a shaft 211. Shaft 211 can include an outer surface 212. When the components of joint 200 are assembled, various surfaces of first node 201, tube 203, second node 205, and interconnect 206 can be positioned close to each other in the interior of the joint. These surfaces may be referred to as joint surfaces. Base 209 can include a joint surface 213 and a joint surface 215. A channel 217 can run through interconnect 206, with one end of the channel including an opening 219 in base 209, and another end of the channel including an opening 221 in shaft 211. In various embodiments, channel 217 can include openings at other locations on interconnect 206, can include more than two openings, can include one or more openings at each of joint surfaces 213 and 215, can include openings arranged in an even distribution around a cross-sectional surface of the interconnect, and many other possible configurations. As mentioned above, one of seals 207 can be positioned within notch 208, which may run around the perimeter of shaft 211. In this regard, seal 207 may be positioned on interconnect 206 prior to the interconnect being moved into position for assembly, for example.

A joint surface 223 of first node 201 and a joint surface 213 of interconnect 206 can be complementary surfaces. In other words, joint surfaces 213 and 223 can complement each other so that the surfaces fit together. For example, joint surface 213 can include a portion of a hemispherical surface, and joint surface 223 can include a complementary portion of an inverse-hemispherical surface.

Tube 203 can include an inner surface 227, a joint surface 229, and a joint surface 231. Joint surface 229 can be shaped to fit with a joint surface 225 of first node 201. In this example, joint surface 229 is a tapered surface. In various embodiments, joint surface 229 can include a flat, cross-sectional surface at the end (i.e., in the case that the tube were cut perpendicular to the length axis). In various embodiments, tube 203 can be a straight cylinder with no taper, and joint surface 229 can include a portion of the outer surface of tube 203 without taper. In various embodiments, joint surface 229 can be smooth, threaded, etc. Joint surface 225 of first node 201 can be a complementary shape of joint surface 229.

Inner surface 227 of tube 203 can be a straight cylindrical surface, for example. In various embodiments, inner surface 227 can include a tapered cylindrical surface, a threaded surface, etc. Inner surface 227 can be shaped to fit with interconnect 206, and in particular, may be shaped to fit with outer surface 212 of shaft 211 of the interconnect.

Similarly, second node 205 can include a joint surface 233 that is shaped to fit with joint surface 231 of tube 203, and can include a joint surface 235 that is shaped to fit with joint surface 215 of interconnect 206.

Joint surface 223 can include one of notches 208 and joint surface 225 can include another one of notches 208. Likewise, joint surface 233 can include one of notches 208 and joint surface 235 can include another one of notches 208.

FIG. 2B illustrates how first node 201 and second node 205 can be positioned so that seals 207 can be inserted into notches 208. In particular, one of seals 207 can be inserted in notches 208 in joint surfaces 225 and 233, and another one of seals 207 can be inserted in the notches in joint surfaces 223 and 235. For example, these seals 207 may also be rubber seals, such as rubber rings. In this embodiment, seals 207 that are inserted in notches 208 in first node 201 and second node 205 are thicker than the seal inserted into the notch around shaft 211 of interconnect 206. The thicker seals can create a desired distance between components made of different materials. In this example, first node 201 and second node 205 can be made of a first metal, and tube 203 and interconnect 206 can be made of a second metal. The thicker seals can create a larger distance between the first-metal components (i.e., the nodes) and the second-metal components (i.e., the tube and interconnect), as will be described in more detail below with respect to FIG. 2D.

FIG. 2C illustrates all of the components of joint 200 assembled together prior to joining. In particular, FIG. 2C illustrates how the various joint surfaces of the components complement each other and fit together.

FIG. 2D illustrates the various components of joint 200 assembled and joined. In particular, an adhesive 237 can be injected into channel 217. Adhesive 237 can fill in the spaces in between the joint surfaces 213 and 223, 225 and 229, 231 and 233, 235 and 215, and in between inner surface 227 of tube 203 and outer surface 212 of interconnect 206. In this example, seals 207 can contain adhesive 237 to the spaces between the joint surfaces. In this way, for example, first node 201, tube 203, and second node 205 can be joined together with interconnect 206. Moreover, seals 207 may allow adhesive 237 to be injected more forcefully without concern for excess adhesive leaking out of the joint, which may allow quicker assembly. Similarly, seals 207 may allow for a less viscous adhesive to be used, which may allow a wider range of adhesives to be used.

As FIG. 2D illustrates, seals 207 and adhesive 237 can create a spacer structure 239 that can separate the various components of joint 200. In particular, the thicker seals separate the first-metal components (i.e., the nodes) and the second-metal components (i.e., the tube and interconnect) by a larger distance, while the thinner seal around the interconnect's shaft separates the tube and interconnect by a smaller distance. In this way, for example, components made of dissimilar metals can be separated by a larger distance to reduce or prevent galvanic corrosion, while components made of the same (or similar) metal can be spaced more closely together, which may allow a more rigid structure.

Spacer structures can be configured to meet the design requirements of the joints. For example, spacer structures can create a variety of separation distances between components of joints. In various embodiments, spacer structures can create larger separation distances between components in order to reduce or prevent a reaction between the components. For example, a larger separation distance may be helpful to reduce or prevent galvanic corrosion, particularly in joints that have adjacent components with very different electrode potentials. Spacer structures can be made of a variety of materials, such as rubber, adhesive, plastic, metal, etc. The material composition of a spacer structure can be designed to provide a particular benefit, such as providing flexibility of movement among joint components, providing rigidity to reduce or prevent movement among joint components, making the joint water resistant or waterproof, making the joint resistant to other substances, such as oil, grease, dirt, etc. In various embodiments, for example, the structural design and material composition of the spacer structure can allow the joint to fail gracefully, which may allow the joint to be used as part of a crush zone by allowing a portion of the crash energy to be dissipated in a controlled, partial failure of the joint.

FIG. 2E shows a perspective view of joint 200. As FIG. 2E illustrates, the joining technique can allow the exposed surface of base 209 (at the bottom of the base as shown in the FIGS. 2A-D) to be flush with the bottom surfaces of first node 201 and second node 205, while at the same time allowing the surfaces of the base, first node, and second node to be separated by a gap 241 (also shown in FIG. 2D) due to spacer structure 239. In this way, for example, the joining technique can result in a smooth, flat surface that has an appealing look and that reduces the need for post-processing, such as sanding, finishing, etc., and therefore, nodes and tubes can be joined in such a way that manufacturing time and cost can be reduced.

First node 201 and second node 205, as well as one or both of tube 203 and interconnect 206 can be fabricated by additive manufacturing. For example, first node 201, second node 205, and interconnect 206 can be additively manufactured. In some embodiments, first node 201, second node 205, and interconnect 206 can be additively manufactured in the same print run. In various embodiments, additive manufacturing can take advantage of the complementary surfaces of interconnect 206 and first and second nodes 201 and 205 by spacing fabricating these structures close together with the complementary surfaces adjacent to each other. In this way, for example, these structures can allow a more efficient additive manufacturing process because they are able to be packed together more closely, thus increasing the yield of each printing run.

Figure 3A:
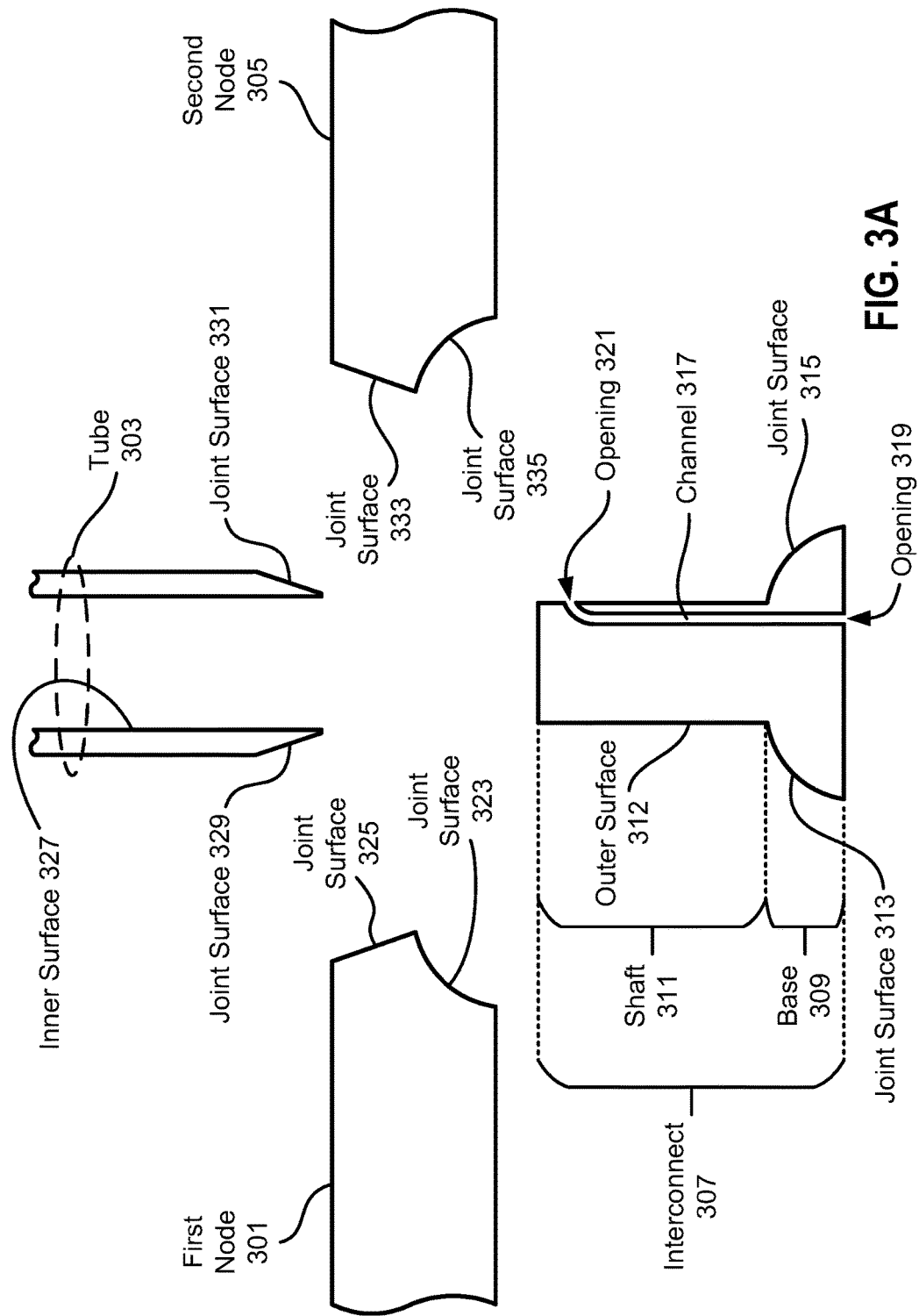
Figure 3D:
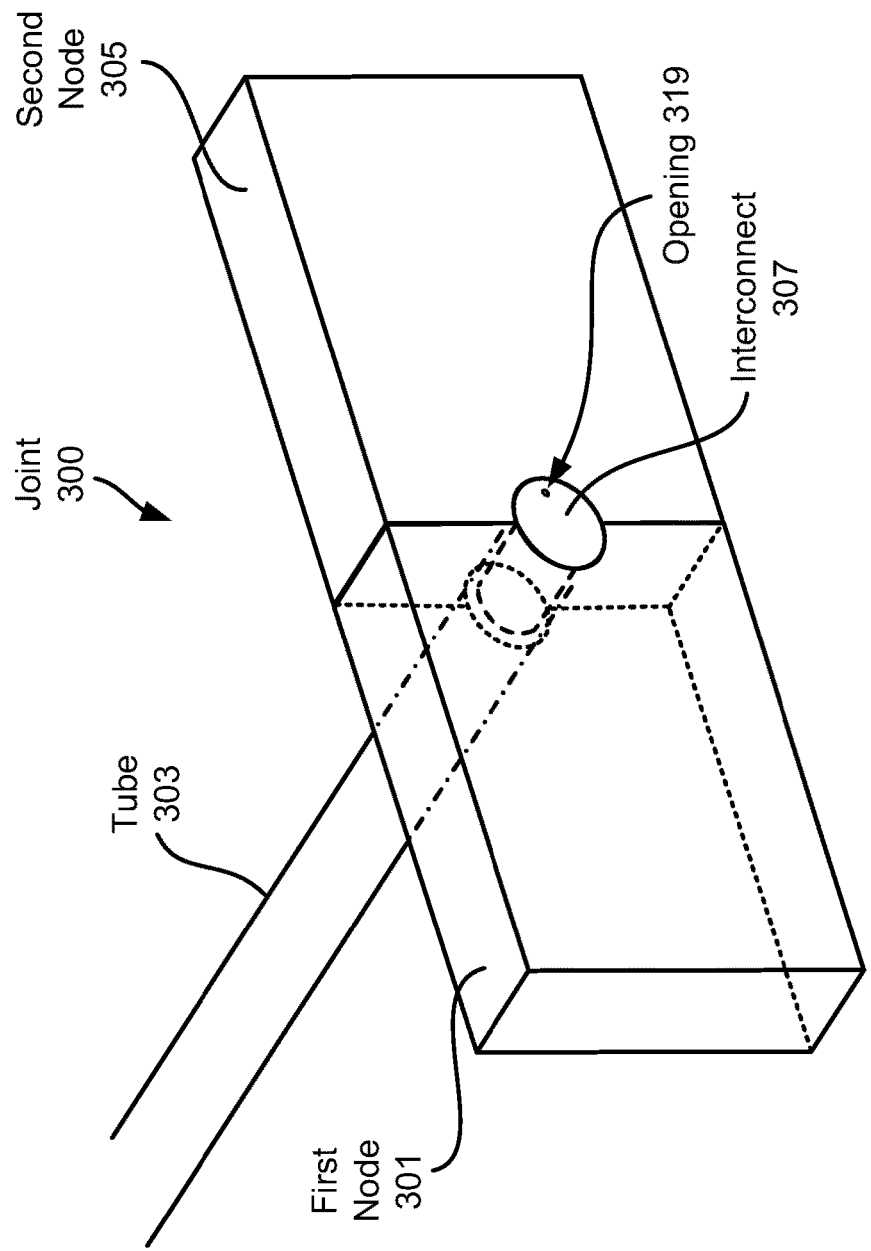

FIGS. 3A-D illustrate exemplary nodes, tube, and interconnect that form a joint 300 (shown in FIGS. 3C and 3D). FIG. 3A illustrates various components of joint 300 prior to assembly and joining. In particular, a first node 301, a tube 303, and a second node 305 can be joined by an interconnect 307. Interconnect 307 can include a base 309 and a shaft 311. Shaft 311 can include an outer surface 312. Base 309 can include a joint surface 313 and a joint surface 315. A channel 317 can run through interconnect 307, with one end of the channel including an opening 319 in base 309, and another end of the channel including an opening 321 in shaft 311. In various embodiments, channel 317 can include openings at other locations on interconnect 307, can include more than two openings, can include one or more openings at each of joint surfaces 313 and 315, can include openings arranged in an even distribution around a cross-sectional surface of the interconnect, and many other possible configurations.

First node 301 can include a joint surface 323 and a joint surface 325. Joint surface 323 of first node 301 and joint surface 313 of interconnect 307 can be complementary surfaces. In other words, joint surfaces 313 and 323 can complement each other so that the surfaces fit together. For example, joint surface 313 can include a portion of a hemispherical surface, and joint surface 323 can include a complementary portion of an inverse-hemispherical surface.

Tube 303 can include an inner surface 327, a joint surface 329, and a joint surface 331. Joint surface 329 can be shaped to fit with joint surface 325 of first node 301. In this example, joint surface 329 is a tapered surface. In various embodiments, joint surface 329 can include a flat, cross-sectional surface at the end (i.e., as if the tube were cut perpendicular to the length axis). In various embodiments, tube 303 can be a straight cylinder with no taper, and joint surface 329 can include a portion of the outer surface of tube 303 without taper. In various embodiments, joint surface 329 can be smooth, threaded, etc. Joint surface 325 of first node 301 can be a complementary shape of joint surface 327.

Inner surface 327 of tube 303 can be a straight cylindrical surface. In various embodiments, inner surface 327 can include a tapered cylindrical surface, a threaded surface, etc. Inner surface 327 can be shaped to fit with interconnect 307, and in particular, may be shaped to fit with outer surface 312 of shaft 311 of the interconnect.

Similarly, second node 305 can include a joint surface 333 that is shaped to fit with joint surface 331 of tube 303, and can include a joint surface 335 that is shaped to fit with joint surface 315 of interconnect 307.

FIG. 3B illustrates the various components of joint 300 assembled together prior to joining. In particular, FIG. 3B illustrates how the various joint surfaces of the components complement each other and fit together.

FIG. 3C illustrates the various components of joint 300 assembled and joined. In particular, an adhesive 337 can be injected into channel 317. Adhesive 337 can fill in the spaces in between the joint surfaces 313 and 323, 325 and 329, 331 and 333, 335 and 315, and in between inner surface 327 of tube 303 and outer surface 312 of interconnect 307. In this way, for example, first node 301, tube 303, and second node 305 can be joined together with interconnect 307.

FIG. 3D shows a perspective view of joint 300. As FIG. 3D illustrates, the joining technique can allow the exposed surface of base 309 (at the bottom of the base as shown in the figures) to be flush with the surfaces of first nodes 301 and 305. In this way, for example, the joining technique can result in a smooth, flat surface that has an appealing look and that reduces the need for post-processing, such as sanding, finishing, etc., and therefore, nodes and tubes can be joined in such a way that manufacturing time and cost can be reduced.

First node 301 and second node 305, as well as one or both of tube 303 and interconnect 307 can be fabricated by additive manufacturing. For example, first node 301, second node 305, and interconnect 307 can be additively manufactured. In some embodiments, first node 301, second node 305, and interconnect 307 can be additively manufactured in the same print run. In various embodiments, additive manufacturing can take advantage of the complementary surfaces of interconnect 307 and first and second nodes 301 and 305 by spacing fabricating these structures close together with the complementary surfaces adjacent to each other. In this way, for example, these structures can allow a more efficient additive manufacturing process because they are able to be packed together more closely, thus increasing the yield of each printing run.

Figure 4B:
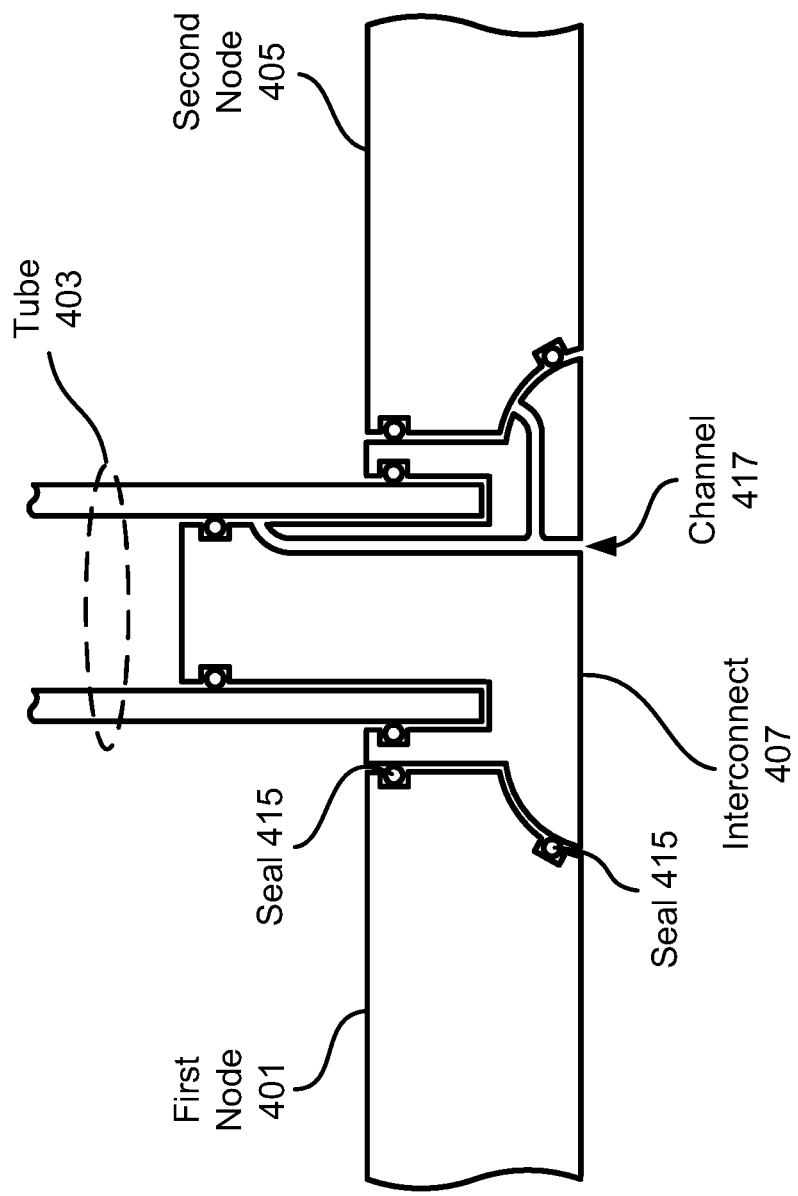
Figure 4C:
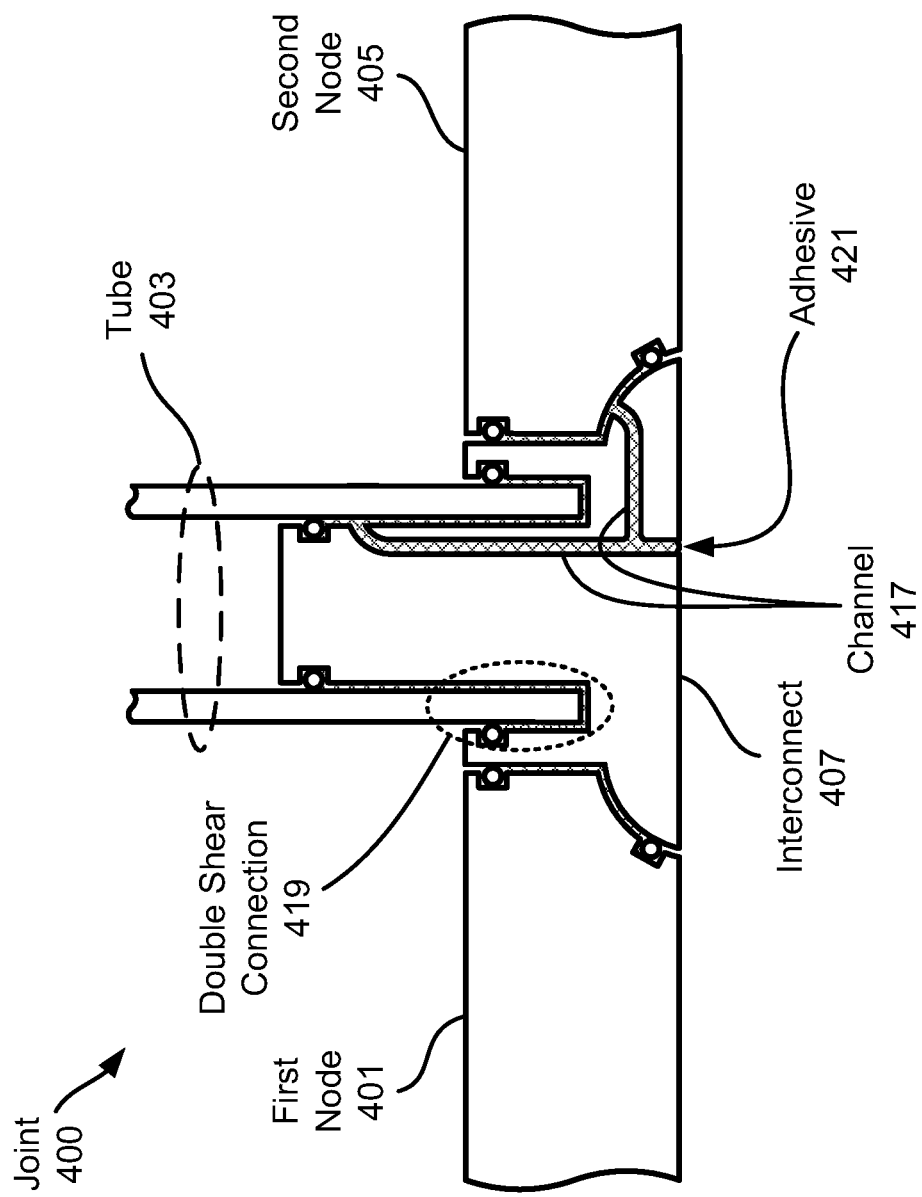
Figure 4D:
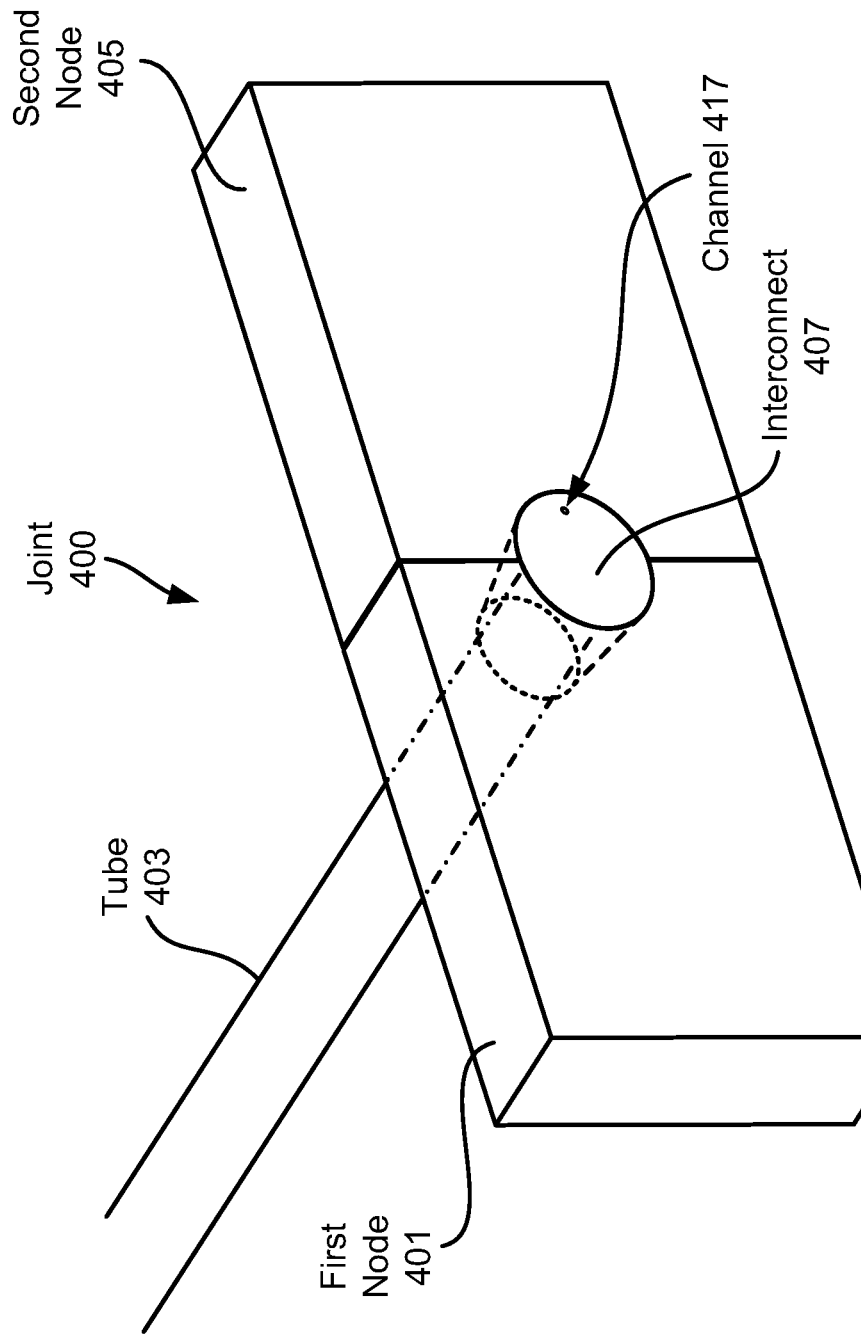

FIGS. 4A-D illustrate exemplary nodes, tube, and interconnect that form a joint 400 (shown in FIGS. 4C and 4D). FIG. 4A illustrates various components of joint 400 prior to assembly and joining. In particular, a first node 401, a tube 403, and a second node 405 can be joined by an interconnect 407. Interconnect 407 can include a base 409 and a shaft 411. In this regard, interconnect 407, first node 401, and second node 405 have various joint surfaces, which are not labeled for the sake of clarity. Interconnect 407 can also include a flange 413. Flange 413 can provide additional joint surface area to connect tube 403 and interconnect 407. In this regard, flange 413 can create a double shear connection 419 between tube 403 and interconnect 407.

First node 401, second node 405, and interconnect 407 can include seals 415 positioned within notches 416, either before positioning for assembly (e.g., the seals positioned in the notches on the interconnect, or after a partial assembly (e.g., the seals positioned in the notches on the first and second nodes). For example, seals 415 can be rubber seals, such as rubber rings, which can compress to form a seal between adjacent components once the joint is assembled. In various embodiments, seals such as seals 415 can be part of a spacer structure that can prevent portions of various components from contacting each other. A channel 417 can run through interconnect 407. In various embodiments, a channel such as channel 417 can include openings at various locations on interconnect 407, can include more than two openings, can include openings arranged in an even distribution around a cross-sectional surface of the interconnect, and many other possible configurations. In this example, channel 417 can include two branches such that an adhesive 421 injected into the channel can be emerge at two different joint surface locations. This can allow adhesive 421 to reach spaces between joint surfaces that are separated by seals 415, for example. After first node 401, tube 403, second node 405, and interconnect 407 are brought together, adhesive 421 can be injected into channel 417 to join nodes and tube together with the interconnect.

As shown in FIG. 4C, first node 401, tube 403, second node 405, and interconnect 407 can include multiple joint surfaces that can complement each other so that the surfaces fit together. It should be noted that other configurations of joint surfaces are possible, for example, tube 403 can include a tapered surface that fits with a likewise tapered opening created by flange 413 in various embodiments. In various embodiments, various joint surfaces can be smooth, threaded, etc.

FIG. 4B illustrates the various components of joint 400 assembled together prior to joining. In particular, FIG. 4B illustrates how the various joint surfaces of the components complement each other and fit together.

FIG. 4C illustrates the various components of joint 400 assembled and joined. In particular, adhesive 421 can be injected into channel 417 and can fill in the spaces in between first node 401 and interconnect 407, between interconnect 407 and tube 403, and between second node 405 and interconnect 407. In this way, for example, first node 401, tube 403, and second node 405 can be joined together with interconnect 407.

FIG. 4D shows a perspective view of joint 400. The joining technique of FIGS. 4A-D can allow the exposed surface of base 409 (at the bottom of the base as shown in the figures) to be flush with the surfaces of first nodes 401 and 405. In this way, for example, the joining technique can result in a smooth, flat surface that has an appealing look and that reduces the need for post-processing, such as sanding, finishing, etc., and therefore, nodes and tubes can be joined in such a way that manufacturing time and cost can be reduced.

One or more of first node 401, tube 403, second node 405, and interconnect 407 can be fabricated by additive manufacturing. For example, first node 401, second node 405, and interconnect 407 can be additively manufactured. In some embodiments, first node 401, second node 405, and interconnect 407 can be additively manufactured in the same print run. In various embodiments, additive manufacturing can take advantage of the complementary surfaces of interconnect 407 and first and second nodes 401 and 405 by spacing fabricating these structures close together with the complementary surfaces adjacent to each other. In this way, for example, these structures can allow a more efficient additive manufacturing process because they are able to be packed together more closely, thus increasing the yield of each printing run.

Figure 5C:
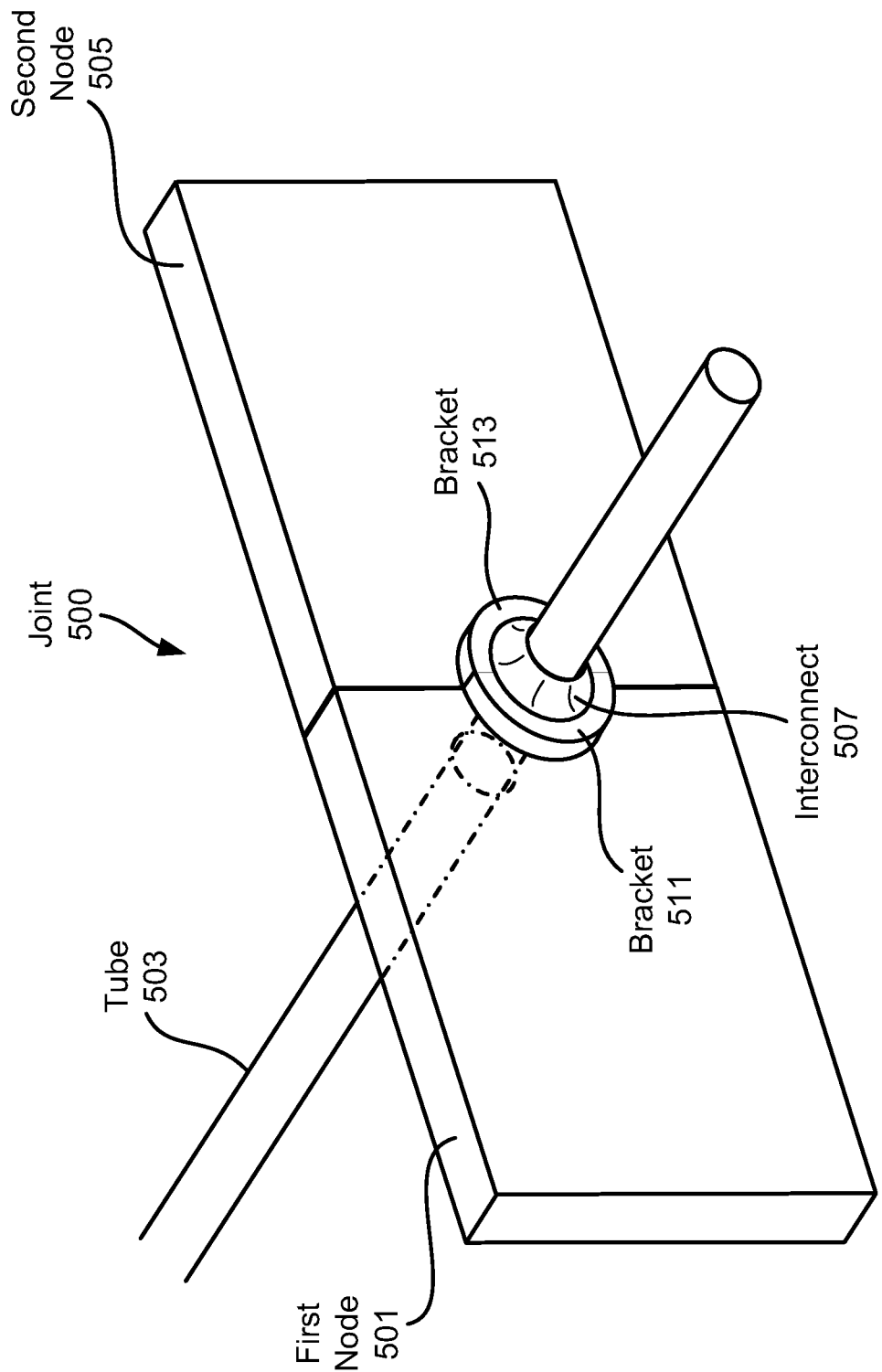

FIGS. 5A-C illustrate exemplary nodes, tube, and interconnect that form a joint 500 (shown in FIGS. 5B and 5C). FIG. 5A illustrates various components of joint 500 prior to assembly and joining. In particular, a first node 501, a tube 503, and a second node 505 can be joined by an interconnect 507. Interconnect 507 can be an annular structure that includes a flange 509. In this regard, FIGS. 5A-B show two portions (also referred to as elements herein) of interconnect 507, and it should be understood that the two portions are part of the same structure that is the interconnect. The two elements of interconnect 507 form a slot 510 in between.

First node 501 can include a bracket 511, and second node 505 can include a bracket 513. Brackets 511 and 513 can be configured to support flange 509. Brackets 511 and 513 can have, for example, an arc shape that matches the annular shape of flange 509. Interconnect 507 can include sealing components, such as seals 515 that can be seated in notches 517. The sealing components can be included on flange 509 and on a surface of slot 510, for example. In various embodiments, seals such as seals 515 can be part of a spacer structure that can prevent portions of various components from contacting each other.

FIG. 5B illustrates the various components of joint 500 assembled and joined. In particular, tube 503 can be inserted into slot 510, with adhesive 519 being applied in the spaces between sealing components. In this regard, seals 515 can contain adhesive 519 to provide a more controlled bonding area. Seals 515 can be, for example, rubber seals or another type of seal. Thus, as shown in FIG. 5B, interconnect 507 can be joined to first node 501, tube 503 can be joined to the interconnect, and the interconnect can be joined to second node 505. Brackets 511 and 513 can provide additional support of interconnect 507 by bracketing flange 509, and the brackets and flange structure can provide a failsafe connection between the interconnect and the first and second nodes in case adhesive 519 fails. In this regard, joint 500 can provide for a graceful failure of the node-interconnect connection.

FIG. 5C shows a perspective view of joint 500. As FIG. 5C illustrates, brackets 511 and 513 come together during assembly to completely cover the outer edge of interconnect 507

It is noted that one or more of first node 501, tube 503, second node 505, and interconnect 507 can be fabricated by additive manufacturing. For example, first node 501, second node 505, and interconnect 507 can be additively manufactured. In some embodiments, first node 501, second node 505, and interconnect 507 can be additively manufactured in the same print run. In various embodiments, additive manufacturing can take advantage of the complementary surfaces of interconnect 507 and first and second nodes 501 and 505 by spacing fabricating these structures close together with the complementary surfaces adjacent to each other. In this way, for example, these structures can allow a more efficient additive manufacturing process because they are able to be packed together more closely, thus increasing the yield of each printing run.

Figure 6A:
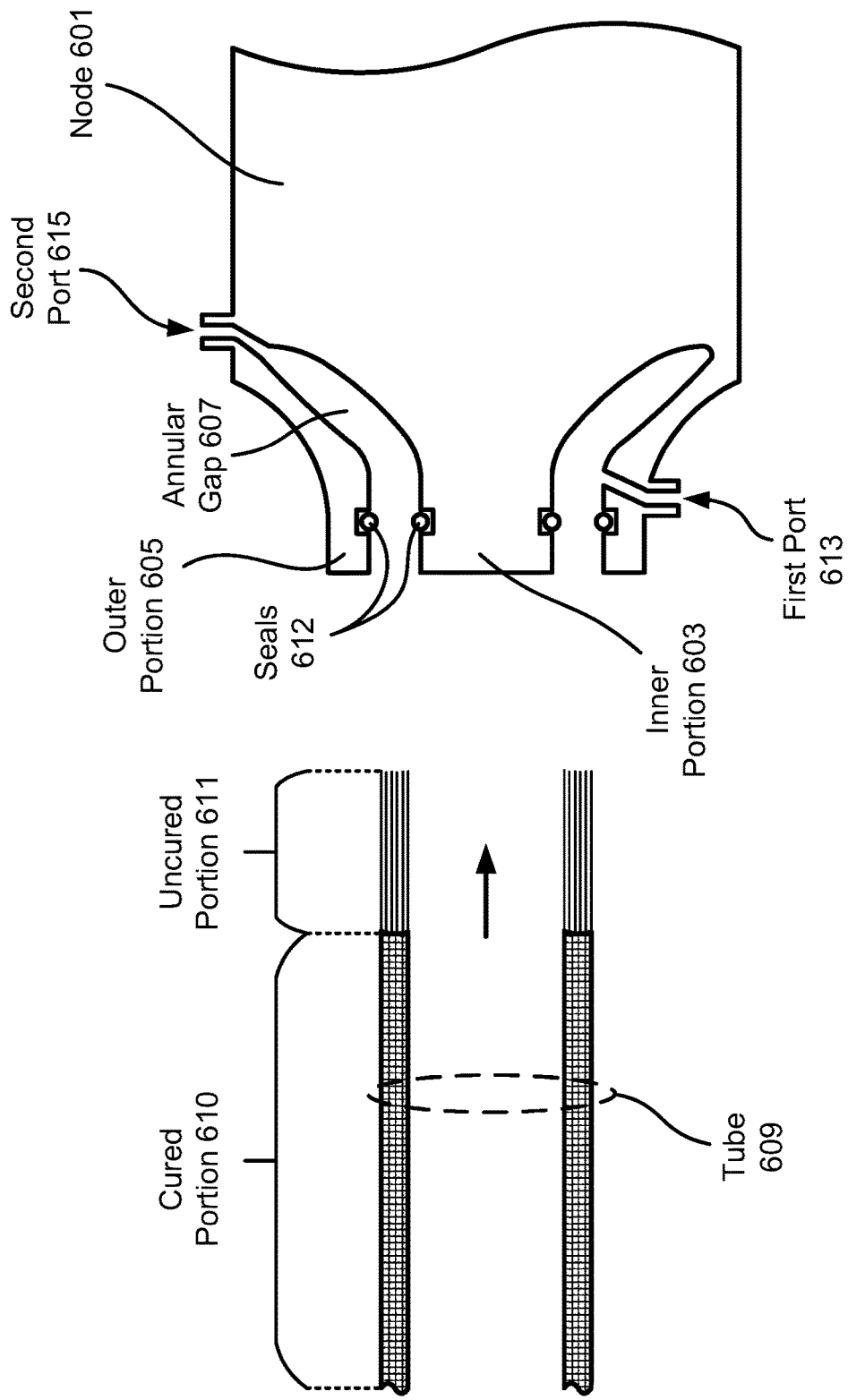
FIGS. 6A-D illustrate an exemplary node including a connection portion to connect to a tube to form a joint.
Figure 6B:
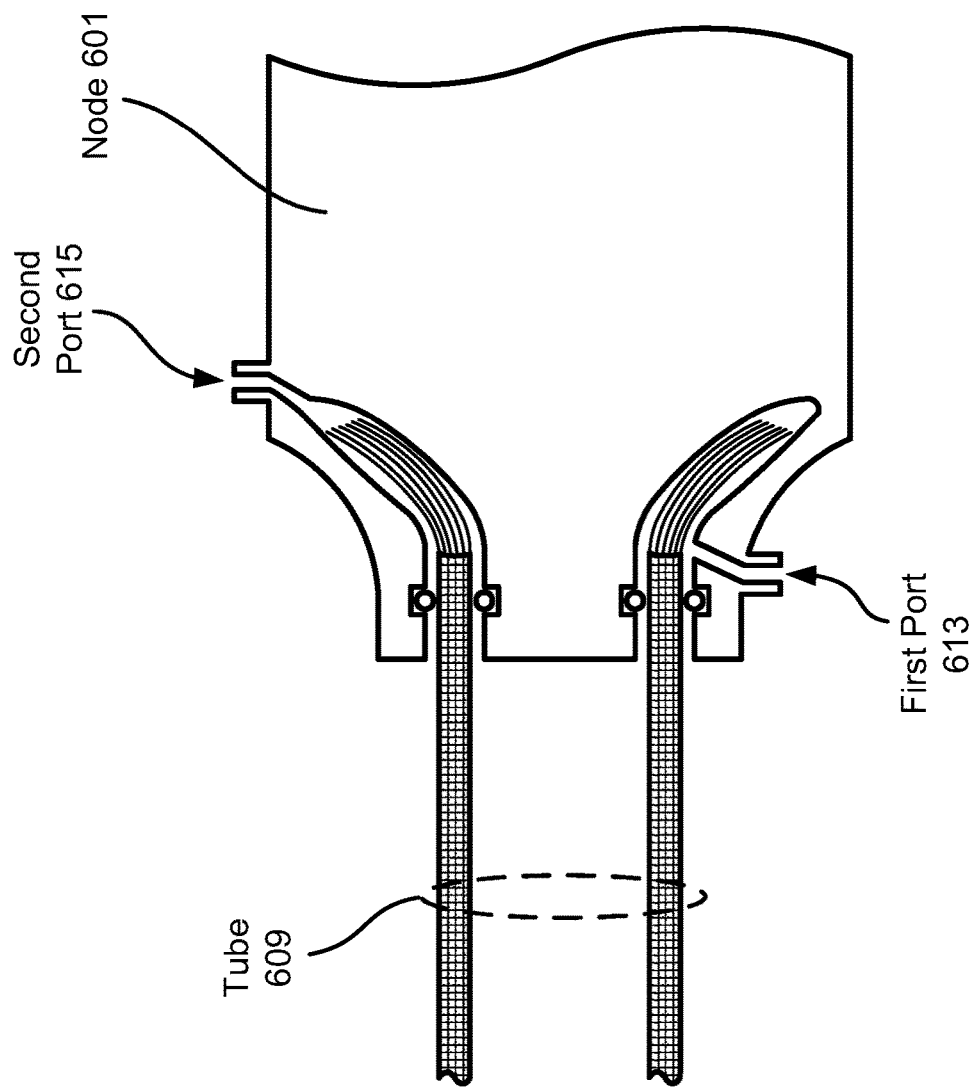
Figure 6C:
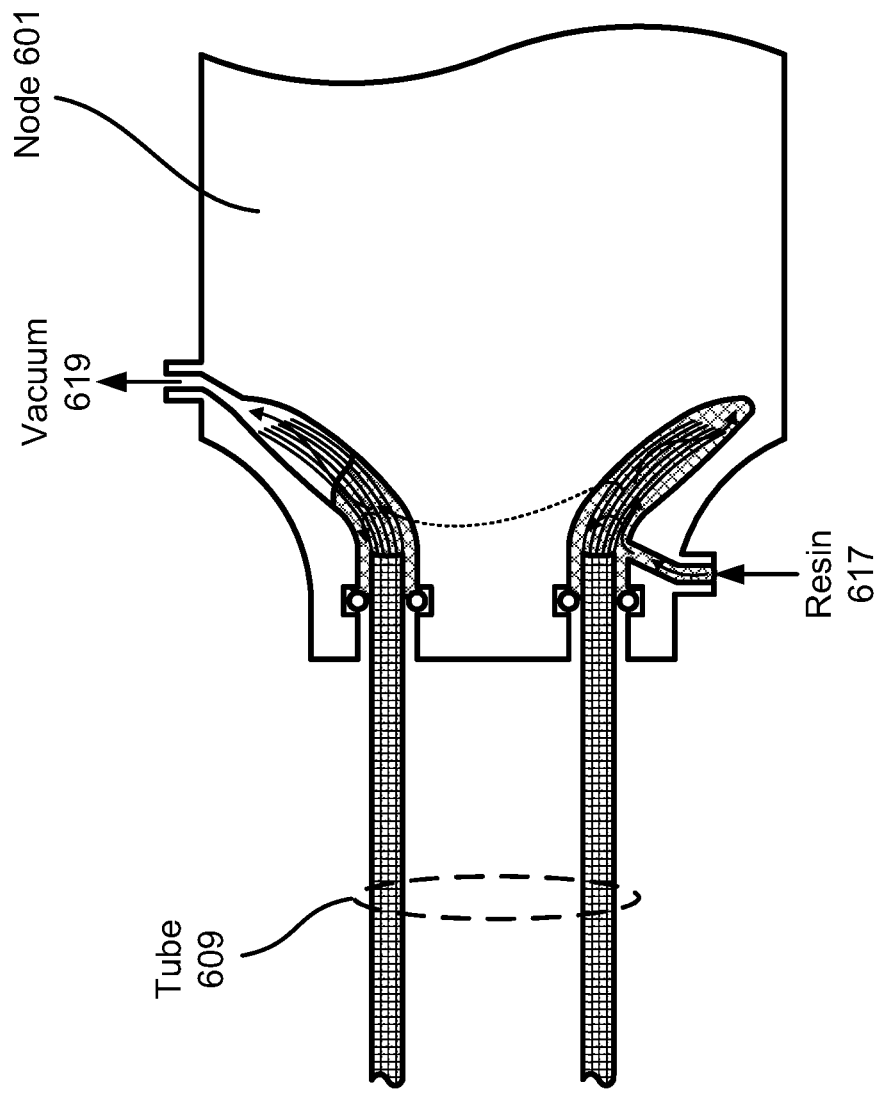
Figure 6D:
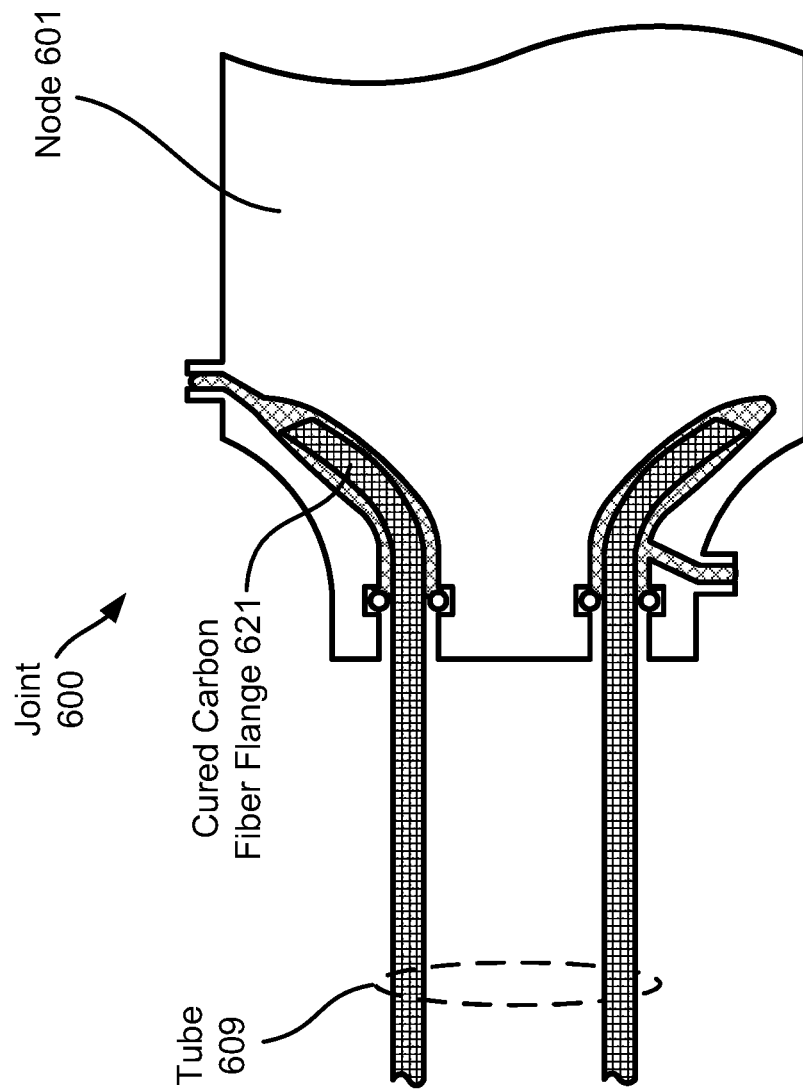

FIGS. 6A-D illustrate an exemplary node including a connection portion to connect to a tube to form a joint 600 (shown in FIG. 6D). FIG. 6A illustrates various components of joint 600 prior to assembly and joining. In particular, a node 601 can include an inner portion 603 and an outer portion 605 at one end. Inner portion 603 and outer portion 605 can form an annular gap 607 in node 601. In various embodiments, inner portion 603 can have a disk shape, and outer portion 605 can have a ring shape concentric with the disk shape, such that annular gap 607 includes a circular ring gap that is configured to fit a circular tube, such as tube 609. In various embodiments, inner and outer portions 603 and 605 can have other shapes, such as square, rectangle, etc., to fit tubes having corresponding other shapes. In this example, tube 609 is a carbon fiber tube that includes a cured portion 610 and an uncured portion 611. The carbon fiber of tube 609 is infused with resin in cured portion 610, and the carbon fiber is not infused with resin in uncured portion 611. In other words, the uncured portion has dry carbon fibers that are not bound to each other, i.e., loose fibers.

Node 601 can be, for example, an additively manufactured metal structure, an additively manufactured plastic structure, a carbon fiber structure, etc. Seals 612 can be arranged on inner surfaces of annular gap 607. Seals 612 can be, for example, rubber seals or another type of seal. In various embodiments, seals such as seals 612 can be part of a spacer structure that can prevent a portion of a tube from contacting the surfaces of the annular gap, for example. Node 601 can also include a first port 613 and a second port 615. First port 613 and second port 615 can be channels that each connect a portion of annular gap 607 to exterior surfaces of the node.

FIG. 6B illustrates the various components of joint 600 assembled together but not yet joined. In particular, tube 609 can be inserted into annular gap 607. The loose carbon fibers of uncured portion 611 of tube 609 can splay and flare outward as they move deeper into annular gap 607. Seals 612 can contact tube 609 to form a seal.

FIG. 6C illustrates a method of joining node 601 and tube 609. Specifically, a resin 617 can be injected into first port 613 while suction, e.g., a vacuum 619 is applied to second port 615. Vacuum 619 draws resin 617 through annular gap 607 and impregnates the loose carbon fibers of uncured portion 611 of tube 609. Resin 617 is allowed to cure to form a carbon fiber bond between node 601 and tube 609.

As seen in FIGS. 6B and C, the diameter of the annular gap can increase as the distance from the end of node (i.e., the depth of the annular gap) increases, which causes the loose carbon fibers of uncured portion 611 to flare out when inserted into the annular gap, creating a flared portion of tube 609 that is form-fitted to the annular gap.

FIG. 6D illustrates joint 600 after resin 617 cures. When resin 617 cures, the portion of the resin that impregnates the loose carbon fibers of tube 609 forms a cured carbon fiber flange 621 that is an integral part of the tube. Moreover, cured carbon fiber flange is formed in the interior of, and form-fitted to, annular gap 607, which can increase the structural integrity of the joint.

The previous description is provided to enable any person skilled in the art to practice the various aspects described herein. Various modifications to these exemplary embodiments presented throughout this disclosure will be readily apparent to those skilled in the art. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. An apparatus, comprising:
an additively manufactured first node including a first surface;
an additively manufactured second node including a second surface;
a tube;
an interconnect connecting the tube to the first and the second nodes, wherein the interconnect comprises a base and a shaft extending from the base, and wherein an exposed surface of the base is flush with the first and the second surfaces when the first node, the second node, the tube, and the interconnect are joined; and
a spacer structure arranged between and entirely separating three or more of the first node, the second node, the tube, and the interconnect.

2. The apparatus of claim 1, wherein the first and the second nodes are adhered to the base and the tube is adhered to the shaft.

3. The apparatus of claim 2, wherein the base comprises a first portion adhered to a complementary portion of the first node and a second portion adhered to a complementary portion of the second node.

4. The apparatus of claim 2, wherein the shaft extends into the tube and is adhered to the inner surface of the tube.

5. The apparatus of claim 1, wherein the interconnect comprises a first element adhered to the first node and the tube, and a second element adhered to the second node and the tube.

6. The apparatus of claim 5, wherein the first and the second elements are arranged to form a slot, and wherein the tube extends through the slot.

7. The apparatus of claim 5, wherein the first node comprises a first bracket supporting the first element and the second node comprises a second bracket supporting the second element.

8. The apparatus of claim 1, further comprising:
the spacer structure arranged between the first node, the second node, the tube, and the interconnect.

9. The apparatus of claim 8, wherein the spacer structure includes a seal.

10. The apparatus of claim 8, wherein the spacer structure includes adhesive.

11. An apparatus, comprising:
an additively manufactured first node;
an additively manufactured second node;
a tube;
an interconnect connecting the tube to the first and the second nodes, wherein
the interconnect comprises a base and a shaft extending from the base; and
a spacer structure arranged between the first node, the second node, the tube, and the interconnect, wherein the spacer structure is configured to entirely separate one or more of the first node and the second node from one or more of the tube and the interconnect by a first separation distance, and wherein the spacer structure is configured to entirely separate the tube from the interconnect by a second separation distance, the second separation distance being smaller than the first separation distance.

* * * * *